(12) United States Patent
Alu et al.

(10) Patent No.: US 11,725,723 B2
(45) Date of Patent: Aug. 15, 2023

(54) ONE BUMP ROTARY MONOSTABLE SHIFTER

(71) Applicant: Kuster North America, Inc., Troy, MI (US)

(72) Inventors: Calogero Alu, Shelby Charter Township, MI (US); Christopher Soave, Oxford, MI (US); Michael Benedetto D'Annunzio, Shelby charter Township, MI (US)

(73) Assignee: Kuster North America, Inc., Troy, MI (US)

( * ) Notice: Subject to any disclaimer, the term of this patent is extended or adjusted under 35 U.S.C. 154(b) by 196 days.

(21) Appl. No.: 17/124,549

(22) Filed: Dec. 17, 2020

(65) Prior Publication Data

US 2021/0190202 A1 Jun. 24, 2021

Related U.S. Application Data

(60) Provisional application No. 62/949,515, filed on Dec. 18, 2019.

(51) Int. Cl.
*F16H 59/08* (2006.01)
*F16H 61/24* (2006.01)
*F16H 59/02* (2006.01)

(52) U.S. Cl.
CPC ............ *F16H 59/08* (2013.01); *F16H 61/24* (2013.01); *F16H 2059/026* (2013.01); *F16H 2059/0295* (2013.01); *F16H 2059/081* (2013.01)

(58) Field of Classification Search
CPC ................ F16H 59/08; F16H 59/0204; F16H 2059/0239; F16H 2059/0252;
(Continued)

(56) References Cited

U.S. PATENT DOCUMENTS 4,378,474 A 3/1983 Olson
7,971,498 B2 7/2011 Meyer et al.
(Continued)

FOREIGN PATENT DOCUMENTS

CN 109505966 A 3/2019
CN 109578568 A * 4/2019 ......... F16H 59/0278
(Continued)

OTHER PUBLICATIONS

Wikipedia contributors. (Dec. 16, 2019). Light-emitting diode. In Wikipedia, The Free Encyclopedia. Retrieved 22:14, Jan. 11, 2023, from https://en.wikipedia.org/w/index.php?title=Light-emitting_diode&oldid=931084843 (Year: 2019).*
(Continued)

*Primary Examiner* — Joseph Brown
(74) *Attorney, Agent, or Firm* — Dinsmore & Shohl LLP

(57) ABSTRACT

A rotary shifter having a knob bi-directionally and biasingly supported upon a housing in a monostable and return-to-center orientation. A printed circuit board assembly is incorporated into the housing and includes a sensor and a processor. A spur gear is rotatably supported within the housing and actuated by the knob, the spur gear supporting a magnet in proximity to the sensor. Rotation of the knob causing rotational displacement of the magnet relative to the sensor in order for the processor to instruct a change in shifter position. The knob incorporating a graphical display for indicating a current shifter position of the assembly.

10 Claims, 20 Drawing Sheets

(58) Field of Classification Search
CPC ....... F16H 2059/026; F16H 2059/0295; F16H 2095/081; F16H 61/24; G05G 1/08
See application file for complete search history.

(56) References Cited

U.S. PATENT DOCUMENTS

| | | | |
|---|---|---|---|
| 8,413,536 B2 | 4/2013 | Giefer et al. | |
| 8,581,718 B2 | 11/2013 | Muller et al. | |
| 9,291,259 B2* | 3/2016 | Watanabe | F16H 59/08 |
| 9,334,949 B2 | 5/2016 | Fett et al. | |
| 9,430,042 B2 | 8/2016 | Levin | |
| 9,835,245 B2* | 12/2017 | Lee | F16H 61/24 |
| 9,863,526 B2 | 1/2018 | Hoskins et al. | |
| 10,310,603 B2 | 6/2019 | Vanhelle et al. | |
| 10,808,833 B2* | 10/2020 | Mega | B60K 20/06 |
| 11,231,780 B2* | 1/2022 | Battlogg | B60K 35/00 |
| 2008/0023309 A1* | 1/2008 | Montalvo | H01H 9/181 |
| | | | 200/332 |
| 2009/0107287 A1 | 4/2009 | Seki | |
| 2011/0219901 A1 | 9/2011 | Giefer et al. | |
| 2012/0249315 A1 | 10/2012 | Vanhelle et al. | |
| 2015/0226317 A1 | 8/2015 | Provenza et al. | |
| 2018/0259063 A1* | 9/2018 | Wang | F16H 59/12 |
| 2018/0372216 A1* | 12/2018 | Yamanaka | B60K 20/02 |
| 2019/0203830 A1* | 7/2019 | Beattie | F16H 61/24 |
| 2020/0182349 A1* | 6/2020 | Asahina | F16H 59/08 |
| 2020/0376963 A1* | 12/2020 | Uenomachi | G06F 3/01 |

FOREIGN PATENT DOCUMENTS

| | | | | |
|---|---|---|---|---|
| CN | 209030180 U | * | 6/2019 | |
| CN | 109973640 A | | 7/2019 | |
| CN | 110185785 A | | 8/2019 | |
| CN | 110431333 A | | 11/2019 | |
| DE | 102005002086 B3 | | 9/2006 | |
| DE | 102012220998 A1 | * | 5/2014 | ............ F16H 61/24 |
| EP | 3225884 A1 | | 10/2017 | |
| EP | 3379370 A1 | | 9/2018 | |
| JP | 2001-184966 A | | 7/2001 | |
| KR | 10-2012-0024324 A | | 3/2012 | |
| WO | 2016011351 A1 | | 1/2016 | |
| WO | WO-2018101907 A1 | * | 6/2018 | ............ F16H 59/08 |
| WO | WO-2019181287 A1 | * | 9/2019 | ............ B60K 37/06 |

OTHER PUBLICATIONS

Wikipedia contributors. (Nov. 17, 2019). Thin-film transistor. In Wikipedia, The Free Encyclopedia. Retrieved 22:15, Jan. 11, 2023, from https://en.wikipedia.org/w/index.php?title=Thin-film_transistor&oldid=926593050 (Year: 2019).*

Wikipedia contributors. (Oct. 26, 2019). LED-backlit LCD. In Wikipedia, The Free Encyclopedia. Retrieved 22:15, Jan. 11, 2023, from https://en.wikipedia.org/w/index.php?title=LED-backlit_LCD&oldid=923124246 (Year: 2019).*

International Search Report and Written Opinion issued by the Korean Intellectual Property Office acting as International Searching Authority for International Application No. PCT/US2020/065831 dated Apr. 19, 2021 (11 pages).

* cited by examiner

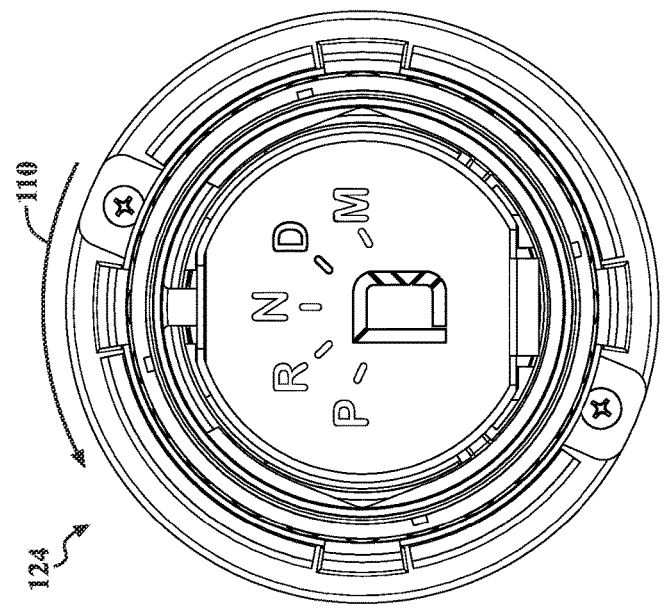
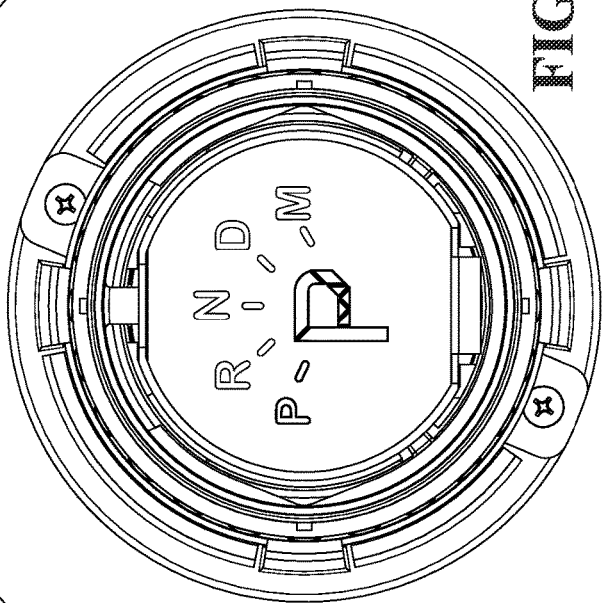
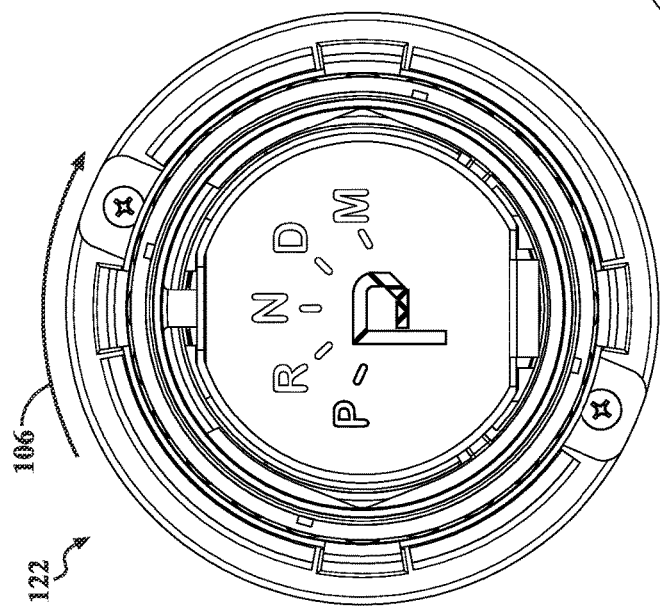
FIG. 25B
FIG. 25C
FIG. 25A

ONE BUMP ROTARY MONOSTABLE SHIFTER

CROSS REFERENCE TO RELATED APPLICATIONS

The present application claims priority of U.S. Ser. No. 62/949,515 filed Dec. 18, 2019, the contents of which are incorporated herein.

FIELD OF THE INVENTION

The present invention relates generally to rotary shifter assemblies. More specifically, the present invention discloses a rotary shifter having single bump or one position monostable clockwise (cw) or counter clockwise (ccw) gear selection for successively shifting through Park, Reverse, Neutral, Drive and Manual positions, this in combination with direct shift functionality in which the dial is held in either of the cw or ccw direction for shifting between either of direct-to-drive or direct-to-park configurations.

BACKGROUND OF THE INVENTION

The prior art discloses a variety of rotary shifter configurations. A first example of this is set forth in CN 109973640 which discloses a monostable rotary knob selector with auto reset and which teaches a double torsional springs arranged in clockwise and counter-clockwise fashion.

DE 10 2005 002 086 teaches a rotary by wire shifter (see translation) with variations of slotted guides and end stops for shifting between gear positions.

CN 109505966 discloses a rotary shifter with multiple magnetic position indicating components.

CN 110185785 teaches a multi-steady state continuation rotation knob shifter with magnet and Hall type sensor.

U.S. Pat. No. 7,971,498 (Meyer) teaches a control device with adjustable stops to limit rotation.

U.S. Pat. No. 8,581,718 to Muller teaches a rotary shifter within a motor vehicle application in which the shifter can include thin film (TFT) transistor functionality.

U.S. Pat. No. 9,334,949 to Fett teaches a motorized shifter knob with a variation of a ring gear arrangement (not monostable).

U.S. Pat. No. 9,863,526 to Hoskins discloses rotary switch shifter with programmable end stops and/or variable tactile feedback.

Finally, US 2015/0226317 to Provenza discloses a mono stable rotary transmission selection system including the selector being axially movable along a central axis between reference and axially depressed positions.

SUMMARY OF THE PRESENT INVENTION

The present invention discloses a rotary shifter assembly with monostable one bump functionality at opposite end stop positions and including a knob shaped handle rotatably supported over a housing. The handle can be either one piece or provided as upper and lower co-rotating components.

A printed circuit board assembly (PCBA) is incorporated into the housing and includes a sensor and a processor. A spur gear is supported within the housing and is actuated by the knob shaped handle. A magnet is supported upon the spur gear in proximity to the sensor and is influenced by a ring gear configured upon a lower circumference of the handle, so that rotation of the knob shaped handle causes displacement of the magnet relative to the PCBA sensor in order for the processor to instruct a change in shifter position. A display component is positioned upon the handle in communication with the PCBA for indicating a current shifter position of the assembly.

The knob shaped handle further includes an open interior incorporating the inner circumferential ring gear with inner circumferential teeth which mesh or inter-engage the opposing exterior teeth of said spur gear. The housing further includes a main housing secured upon a lower cover housing. An outward facing ledge of the housing supports the spur gear in combination with the circumferential extending ring gear.

The knob shaped handle further includes an interior extending actuating portion which, upon rotation, is displaceable a limited arcuate distance about the housing, a shift resistance/bias being exerted against the actuation portion in response to either of clockwise or counter clockwise rotation in order to provide mono stable shifting functionality. Direct shift functionality is provided from either Park to Drive or Drive to Park Shifter positions, in response to holding said rotary shaped knob in a maximum rotated clockwise or counter clockwise position.

In a first selected variant, a torsional spring is secured to the housing and has first and second legs alternatively abutting the interior extending actuating portion in response to rotation in either of clockwise or counter clockwise rotation. A fastener and spring retainer is provided for securing the torsional spring upon the housing. The open interior of the knob shaped handle further includes inner protuberances which seat within arcuate tracks configured within an outer perimeter of the housing for defining a range of rotation in either of clockwise or counter clockwise directions. The inner extending actuating portion further includes lateral extending wing portions alternatively abutting legs of the torsional spring.

In a second selected variant, a pair of spring loaded pawls are incorporated into a main housing, these abutting opposing sloping surfaces defined upon an inner circumferential profile of a rotatable handle in order to influence the handle to the center position when released from either of monostable clockwise or counter-clockwise rotated directions. Other features include the PCBA further having a processor which, upon receiving the signal from the magnet proximate located sensor, or from an external signal, resets the shifter assembly to the Park shifter position.

An illuminating component is associated with the graphical display and LED elements integrated into a surface display. The display can also include either of a thin film transistor display or an organic light emitting diode display. The graphical display further includes segmented LCD elements with LED backlight elements.

BRIEF DESCRIPTION OF THE DRAWINGS

Reference will now be made to the attached drawings, when read in combination with the following detailed description, wherein like reference numerals refer to like parts throughout the several views, and in which:

FIGS. 25A-25C illustrate a succession of Park to Drive and return to Park shifter positions provided by the direct shift operation;

DETAILED DESCRIPTION OF THE PREFERRED EMBODIMENTS

Figure 1:
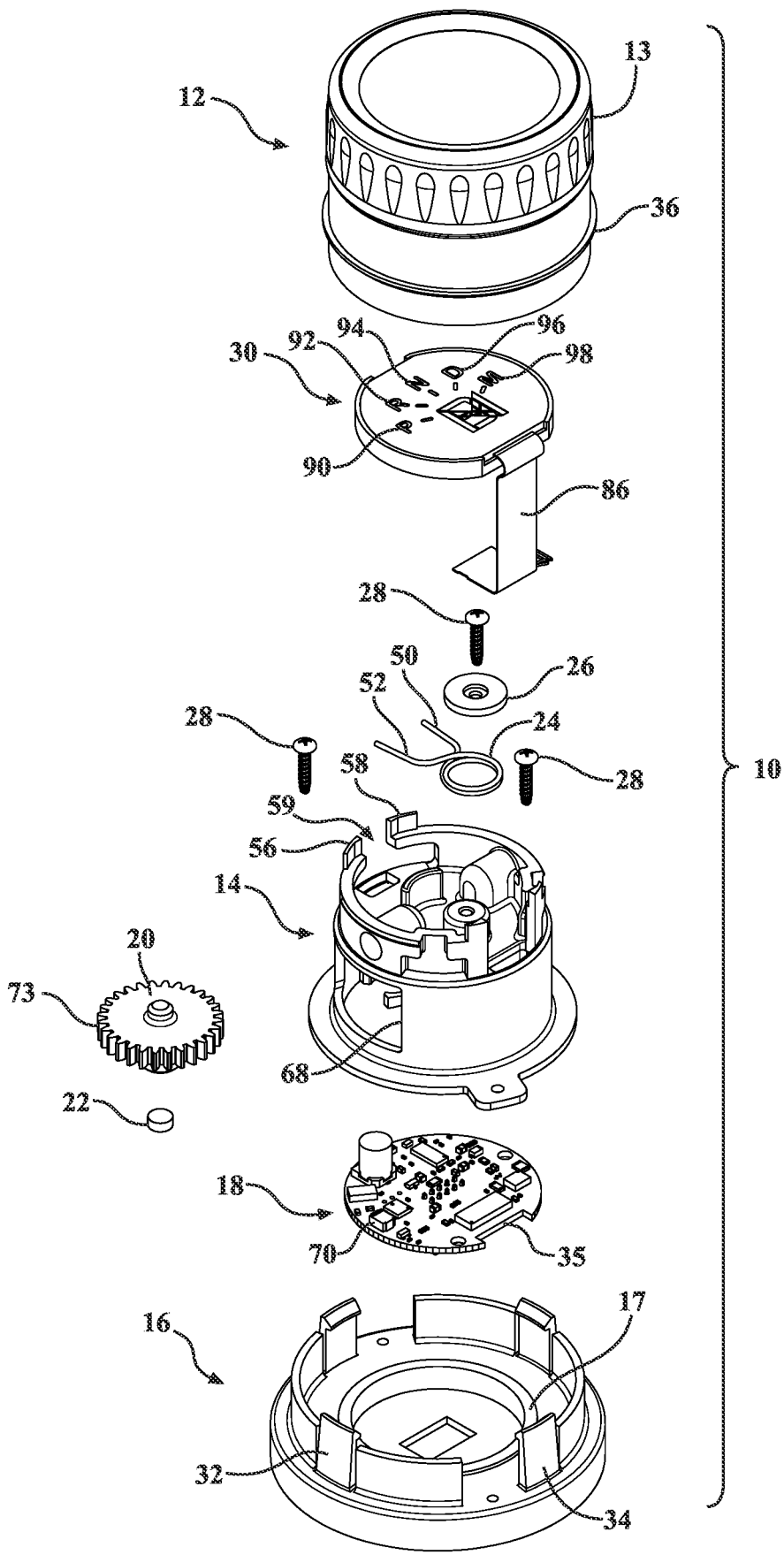
FIG. 1 is an exploded view of the rotary shifter according to the present invention incorporating each of a handle assembly, graphic display, torsion spring, main housing, ASM gear and magnet, PCBA and lower housing.
Figure 2:
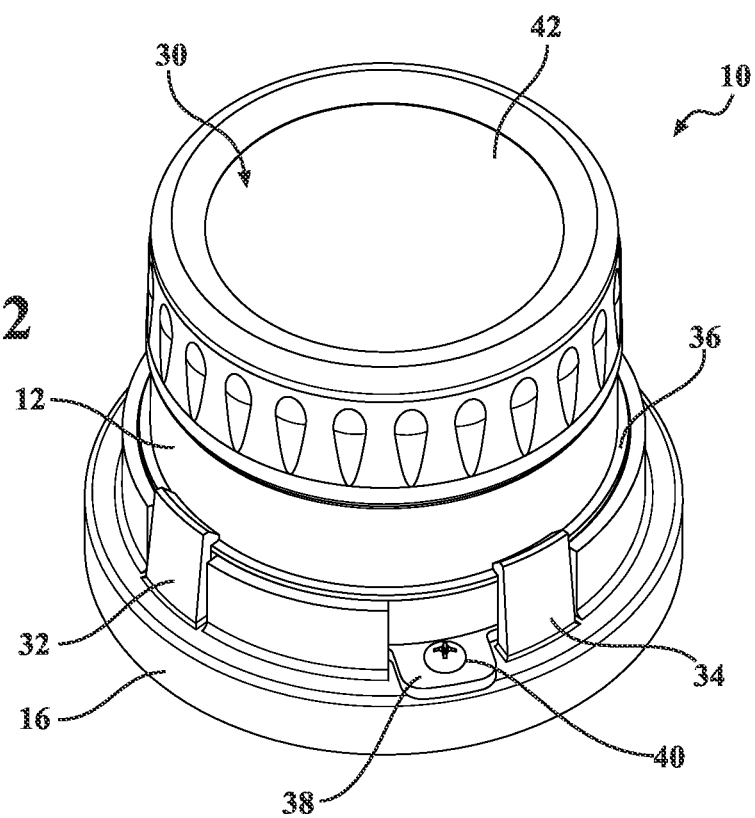
FIG. 2 is an assembled perspective of the rotary shifter such as depicted in FIG. 1.
Figure 32:
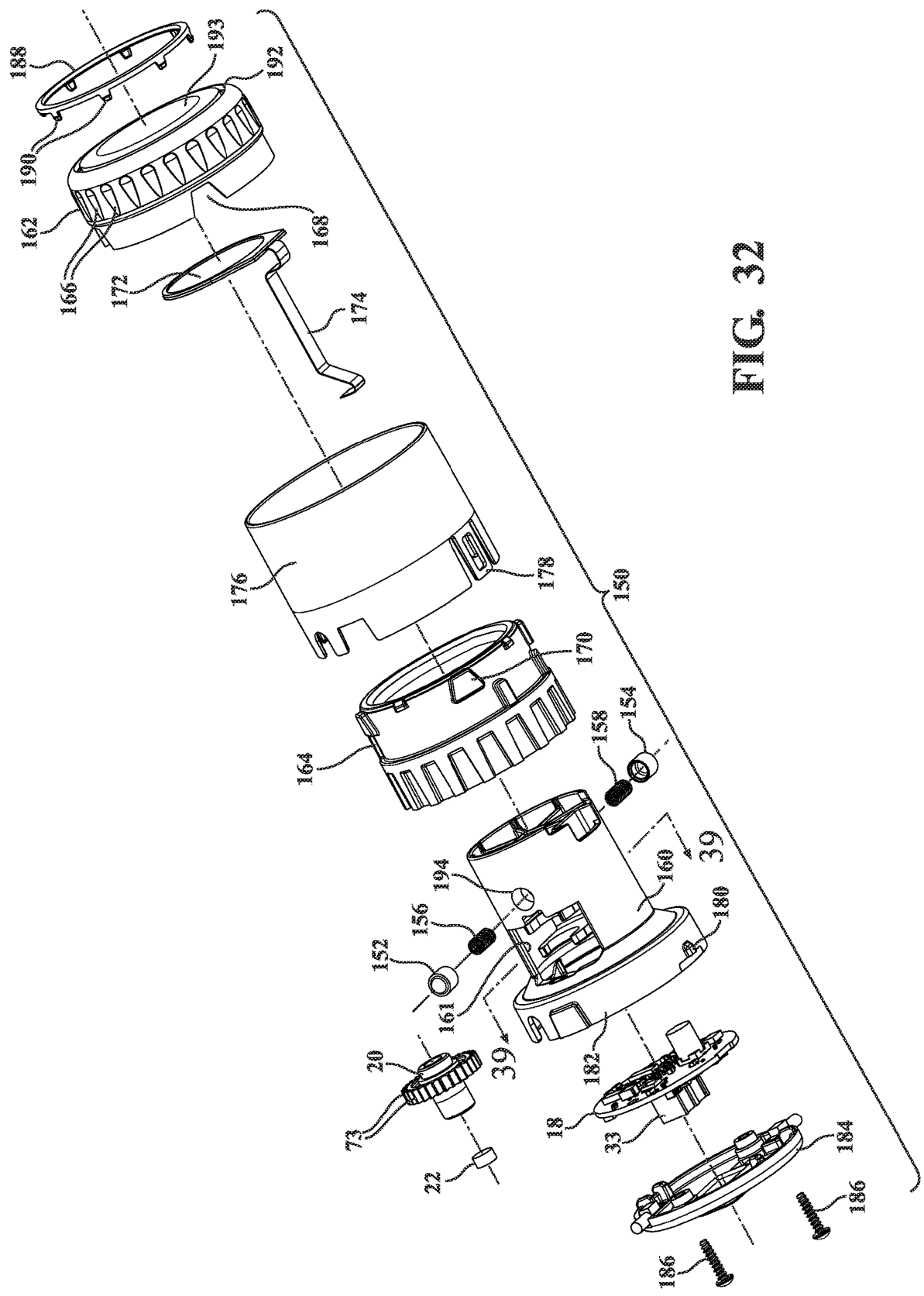
FIG. 32 is an exploded view of the rotary shifter according to a further embodiment of the present invention and which substitutes the return to center torsion spring of FIG. 1 with a pair of spring loaded pawls incorporated into a main housing, these abutting opposing sloping surfaces defined upon an inner circumferential profile of a rotatable handle in order to influence the handle to the center position when released.
Figure 40:
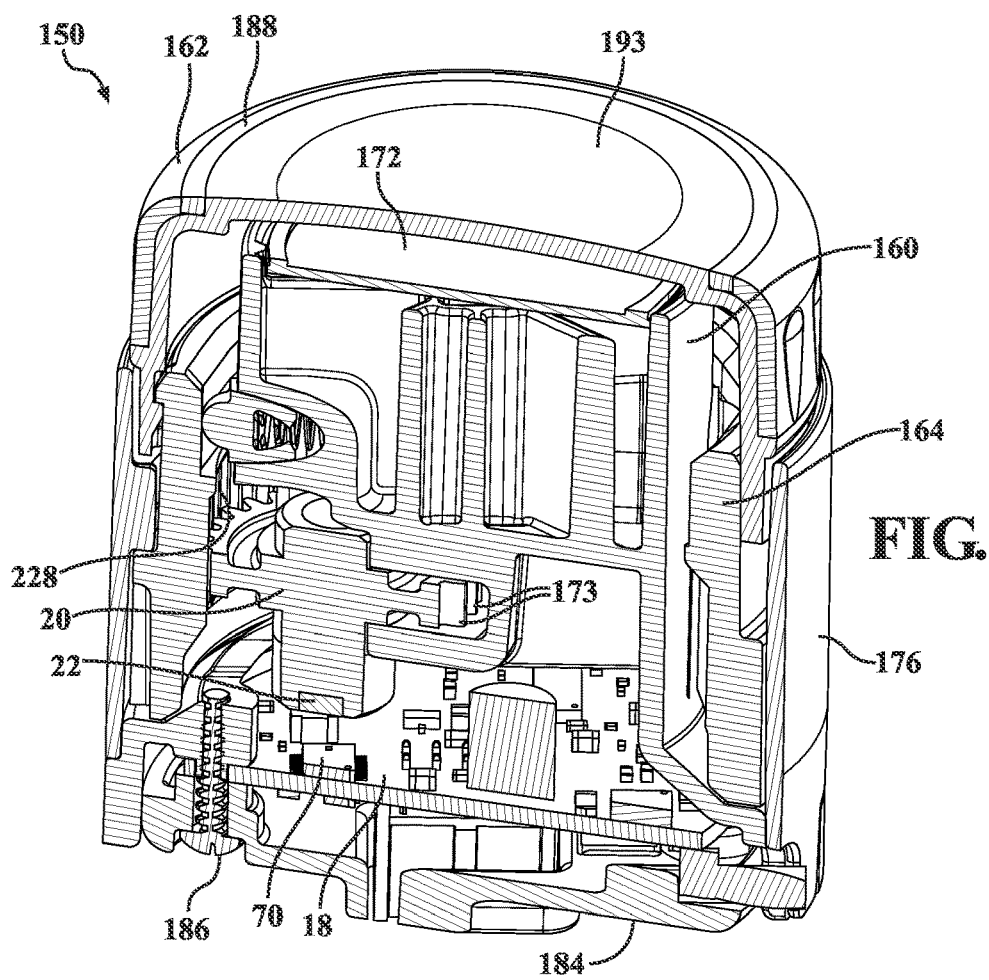
FIG. 40 is a side or height extending cutaway of the assembled shifter of FIG. 32 and illustrating the ASM spur gear and magnet, and PCBA mounted sensor.

With reference to the attached illustrations, the present invention discloses a rotary shifter assembly, see as depicted at 10 in each of FIGS. 1 and 2 according to a first embodiment, as well as at 150 in FIGS. 32 and 40 in a second embodiment. In either version, the rotatable shifter provides single bump or one position monostable clockwise (cw) or counter clockwise (ccw) gear selection for successively shifting through Park, Reverse, Neutral, Drive and Manual positions. As will be further disclosed, an additional direct shift feature includes the dial held in either of the cw or ccw direction for a determined time interval for shifting between either of direct-to-drive or direct-to-park configurations.

Referencing first FIG. 1, an exploded view is depicted of the rotary shifter according to the present invention. The shifter assembly includes each of a knob shaped handle assembly 12 (such including an upper knurled user gripping profile 13 configured upon its circumferential exterior). The handle 12 is rotatably supported upon a main housing 14. A lower cover portion 16 of the housing includes an interior and annular support rim 17 for seating the underside of the main housing 14 and in order to sandwich a circular shaped printed circuit board assembly (PCBA) 18 therebetween.

Figure 6:
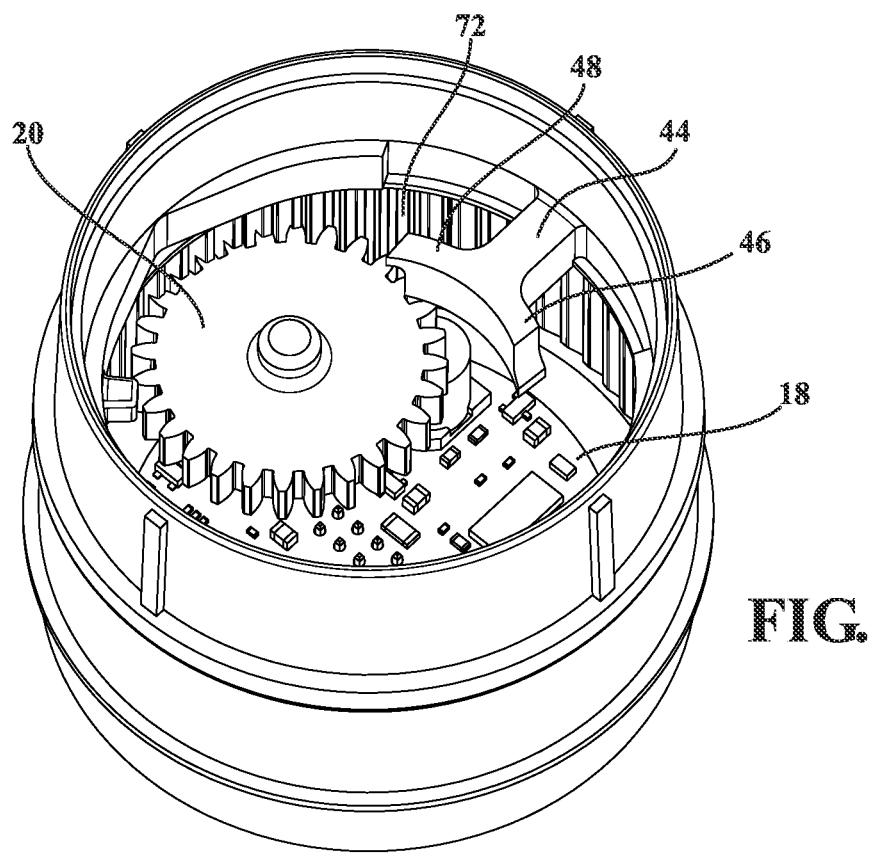
FIG. 6 is a further sectional and downward looking perspective of with other parts removed and showing the annular interior of the rotatable handle assembly with single bump actuating portion, in combination with the gear and PCBA.

An ASM or planetary gear (also termed a spur gear) 20 is supported within the main housing 14 and, upon being actuated by the knob shaped handle 12 (via a circumferentially configured ring gear as further described in FIG. 6, displaces an end mounted magnet 22 positioned in proximity to a sensor component 70 (see FIG. 7) associated with the PCBA 18. Although not shown, an alternate envisioned variant substitutes the planetary gear with end supported magnet in favor of incorporating a ring or hoop shaped magnet directly into a bottom perimeter of the rotatable knob, the ring shaped magnet displacing or riding over the sensor mounted to the PCBA in order to provide position sensing for the various shifter positions.

Other features include a torsion spring 24 which is secured upon the main housing 12 via a spring retainer 26 and fastener 28 and, as will be further described, provides the required shift resistance bias to either of clockwise (cw) or counter-clockwise (ccw) rotation of the handle in order to provide each of the monostable and direct shift functionalty. Also depicted at 30 is a graphic display component for incorporation into the assembly and, as will be subsequently described, can be provided in a variety of different applications not limited to any of thin film transistor (TFT), organic light emitting diode (OLED) or segmented displays.

FIG. 2 is an assembled perspective of the rotary shifter such as depicted in FIG. 1 and which better illustrates additional structural features including upward projecting clasps or tabs 32/34 integrated into the lower housing cover portion 16 which engage an outer annular rim or ledge 36 of the rotatable knob 12, and upon it being assembled over main housing body 14. The main housing can also include bottom tabs 38 or the like which align with surface locations of the bottom cover 16 and which receive screws 40 or the like to secure the assembly together. Also depicted at 42 is transparent surface bezel 42 or the like for covering the display face of the graphic display component 30.

Figure 3:
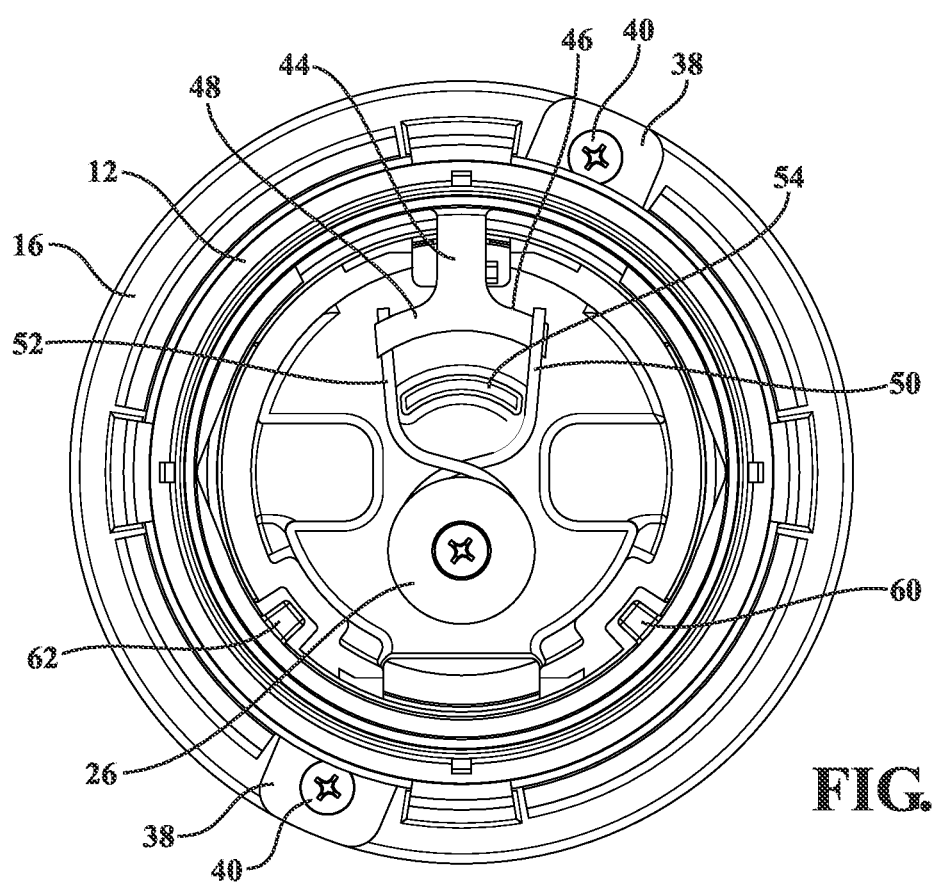
FIG. 3 is an overhead plan view of the rotary shifter with the graphical display removed and illustrating the torsional spring placement upon the main housing depicting the single bump mono stable profile in combination with interior extending spring actuating portion associated with the rotatable handle assembly.
Figure 4:
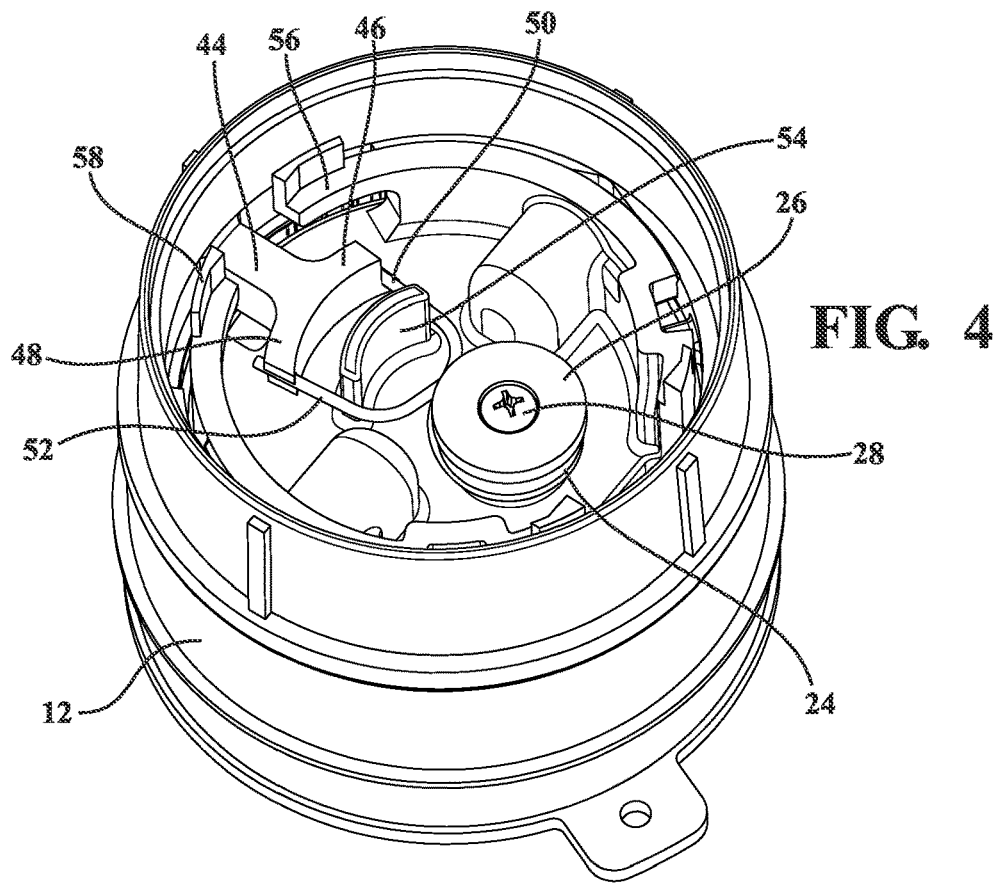
FIG. 4 is a rotated and downward looking perspective of FIG. 3 and depicting the interior of the rotary shifter from another angle.

Proceeding to FIG. 3, an overhead plan view is shown of the rotary shifter with the graphical display removed along with the upper knurled portion 13 for and to illustrate each of the torsional spring 24 placement upon the main housing 14 for depicting the single bump mono stable profile in combination with the interior extending spring actuating portion associated with the rotatable handle assembly. FIG. 4 in combination provides a rotated and downward looking perspective of FIG. 3 and again depicting the interior of the rotary shifter from another angle by which the interior extending actuating portion includes a radially inwardly projecting stem 44 which is integrally formed with an inner side wall location of the interiorly hollowed knob 12, a pair of lateral extending wings 46 and 48 extending from the stem 44 and which are position in alternative abutting fashion with either of first 50 or second 52 extending legs of the interiorly mounted torsional spring 24.

Figure 5:
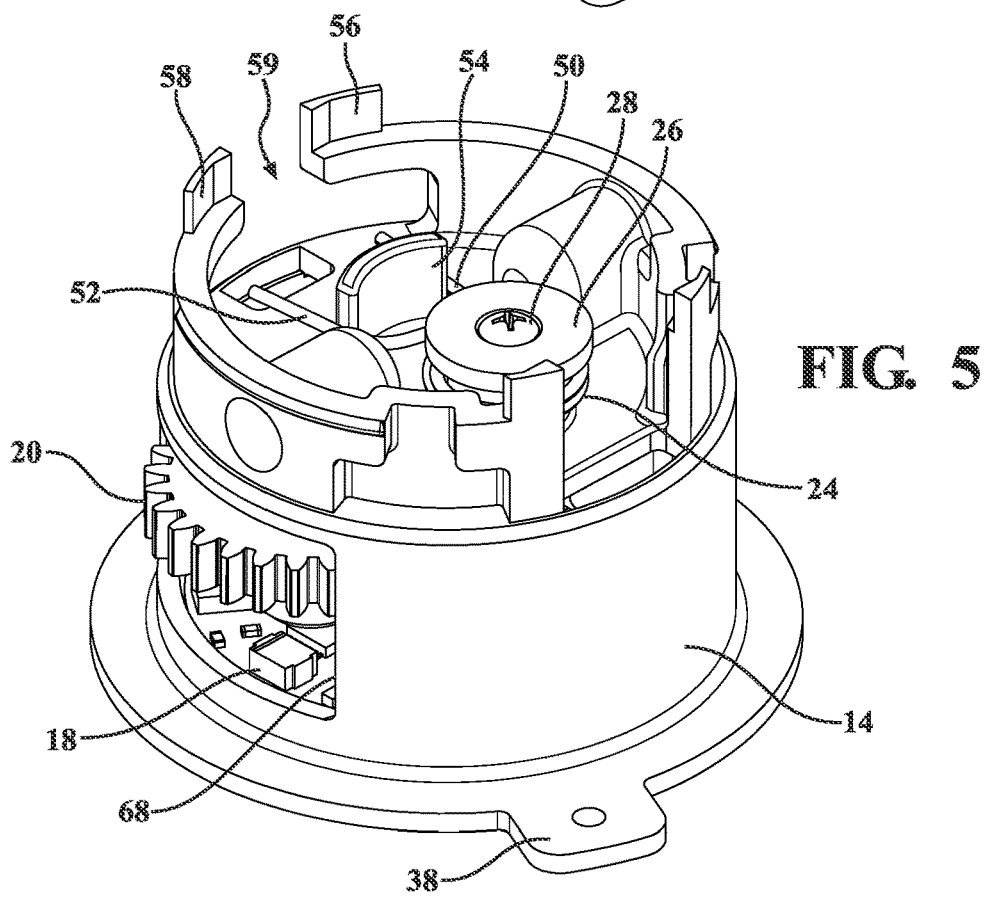
FIG. 5 is a sectional perspective of the main housing, gear and torsional spring components of the present invention.

As further best depicted in FIG. 5, the washer shaped spring retainer 26 and fastener 28 secures the base portion of the torsion spring 24 so that its pair of end extending legs 50/52 straddle on either side of an upper surface embossment 54 of the main housing 14. In this fashion, and as will be further described, clockwise rotation of the knob shaped handle 12 results in a shift resistance bias of the first torsional spring leg 50 against the lateral extending wing 46 of the knob inner extending portion 44, with alternative counter clockwise rotation of the knob shaped handle 12 likewise resulting in a shift resistance bias exerted by the second torsional spring leg 52 against the lateral extending wing 48 of the inner extending portion 44.

Figure 13:
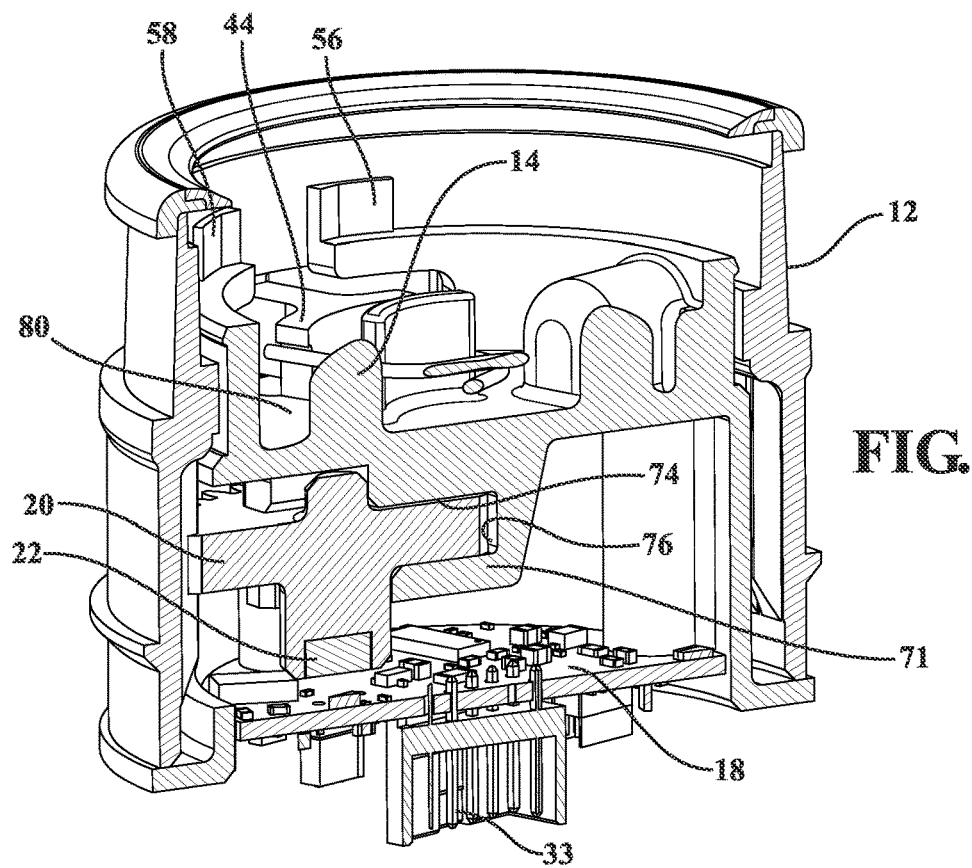
FIG. 13 is a vertical cutaway of the assembly as substantially shown in FIG. 4 and depicting the manner in which the gear and underside supported magnet are arranged within the main housing in communication with underside located PCBA and sensor.

FIG. 5 is a sectional perspective of the main housing 14, spur gear 20 and torsional spring 24 (including extending and shift resistance legs 50/52). In combination with FIG. 4, the upper annular defining perimeter of the main housing 14 further includes a pair of upper opposing and circumferentially spaced overhang locations 56 and 58, which define therebetween a partial circumferential gap (arrow 59) which seats the inner projecting stem portion 44 of the handle 12 and establishes limited rotational ranges in either of the clockwise or counter clockwise directions. Reference is also made to FIG. 13 which depicts the seating configuration of the interior arcuate resistance engagement portion (stem 44 and wings 46/48) relative an interior seating track profile (see at 80) defined within the upper surface configuration of the main housing 14.

Figure 8:
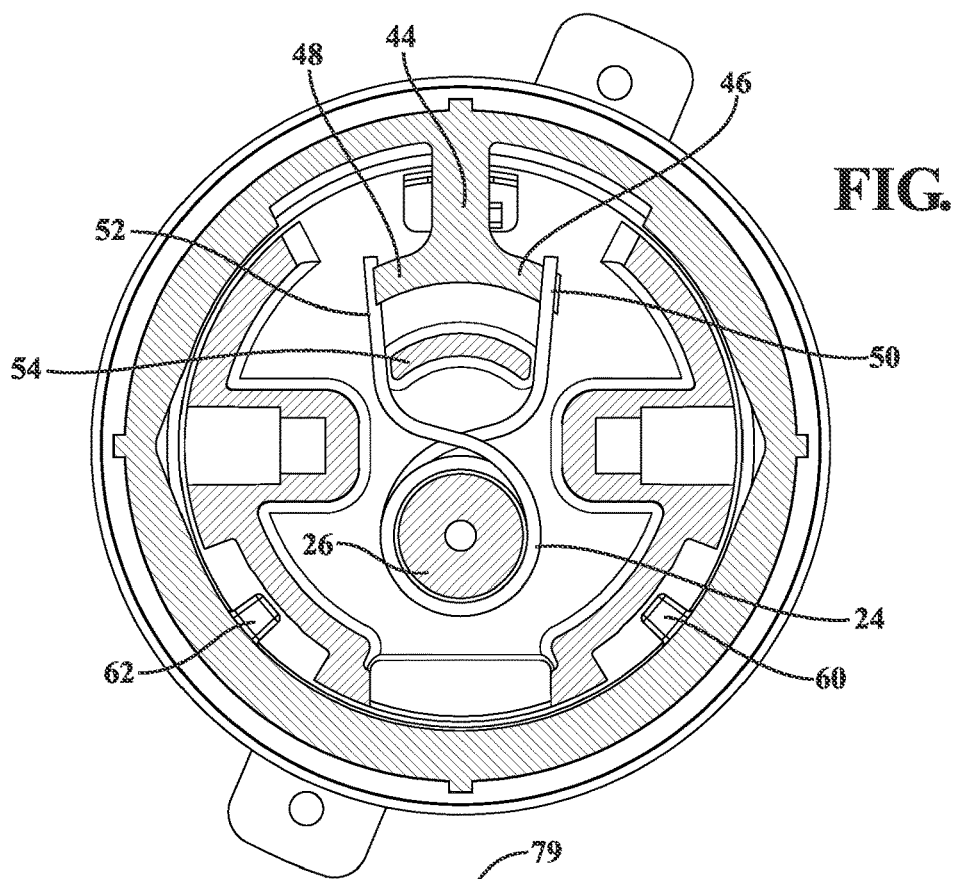
FIG. 8 is an overhead plan illustration similar to that shown in FIG. 4 and showing the rotary shifter in a home position.
Figure 9:
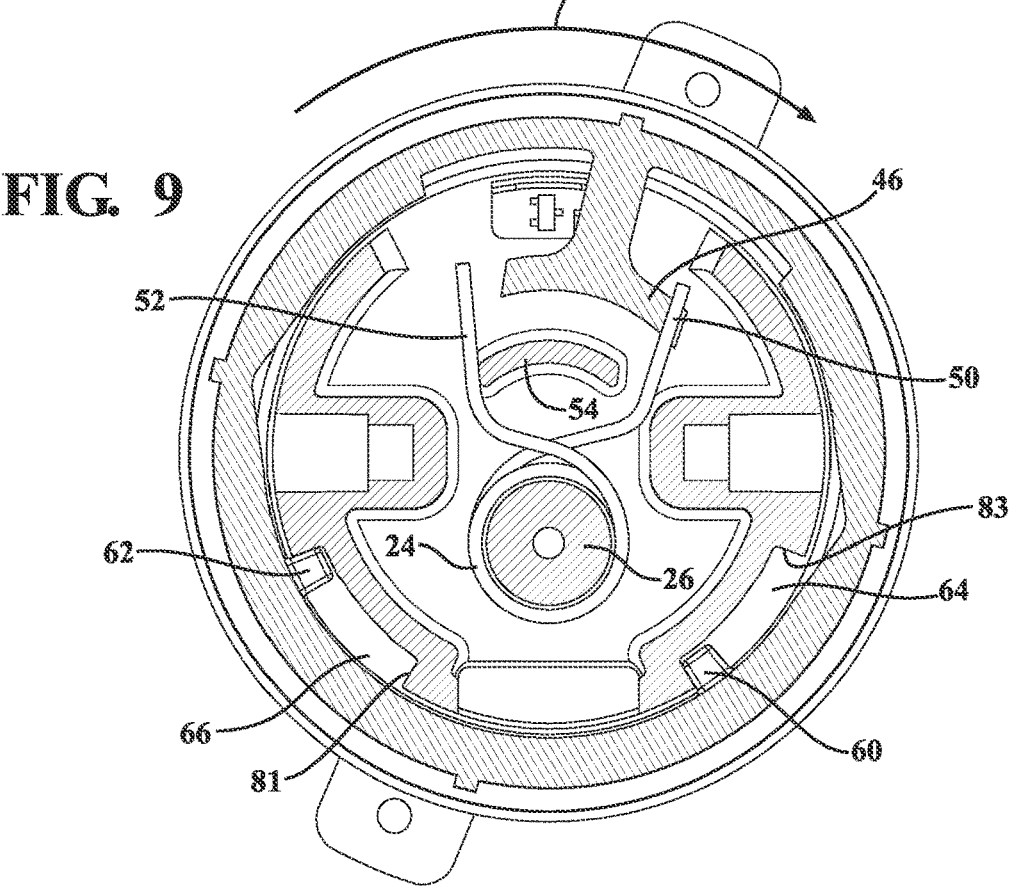
FIG. 9 is a succeeding illustration to FIG. 8 and depicting the handle assembly being rotated in a clockwise direction so that inner protuberances of the handle abut end stop locations configured in the main housing concurrent with the rotary engagement of the spring actuating portion.
Figure 10:
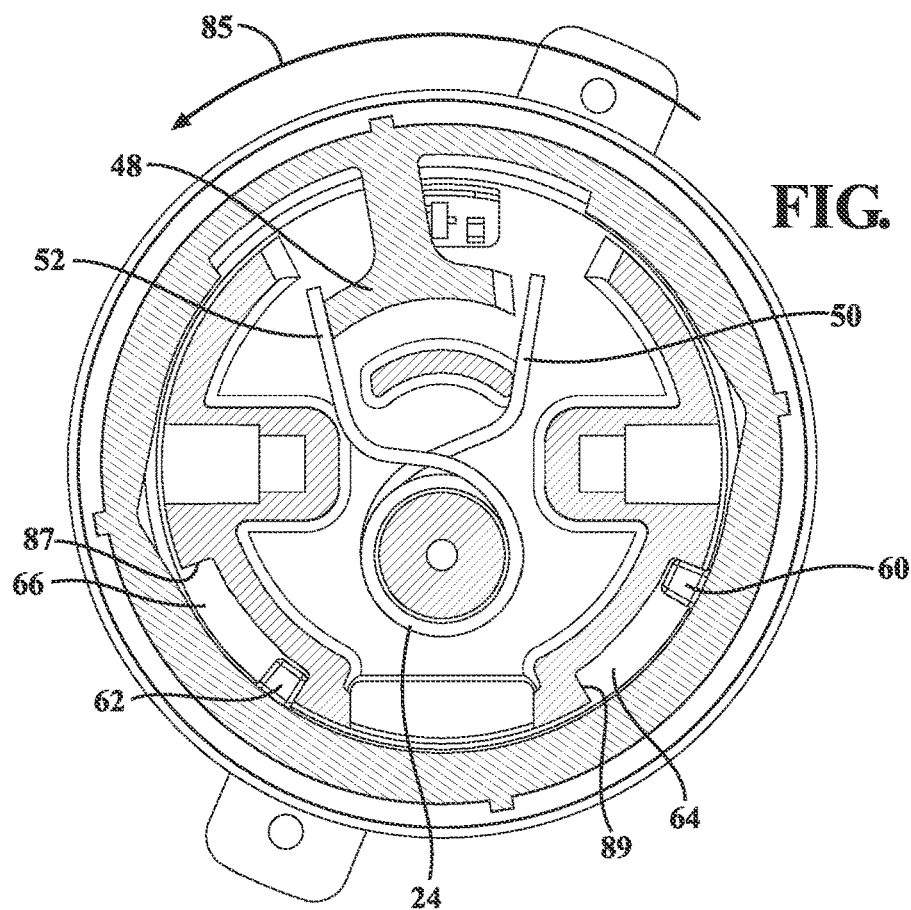
FIG. 10 is an alternate succeeding illustration to FIG. 8 and depicting the handle assembly being rotated in a counter clockwise direction so that inner protuberances of the handle abut additional end stop locations configured in the main housing concurrent with the rotary engagement of the spring actuating portion in a counter direction to that depicted in FIG. 9.

Also depicted in FIG. 3, in combination with succeeding FIGS. 8-10, are additional integrally formed and inner protuberances 60 and 62 associated with the annular interior of the knob 12, these seating within limited arcuate slots 64 and 66 defined along the interior opposing profile of the inner housing 14 and, in combination with the circumferential gap seating the inner arcuate portion stem 44, defining the specified range of clockwise (cw) or counter-clockwise (ccw) rotation of the shifter knob in either of the monostable or direct to Drive/direct to Park shift functionalities.

FIG. 5 again depicts the main housing 14 which includes a closed interior window or profile cutout, see perimeter 68, defining an annular window through which partially projects a toothed exterior gear profile of the planetary or spur gear 20. In combination, FIG. 13 depicts a vertical cutaway of the assembly as substantially shown in FIG. 4 and further illustrating the manner in which the planetary/spur gear 20 and underside supported magnet 22 are arranged within the main housing 12 in overhead proximity to the underside located PCBA 18 and sensor (see as further depicted at 70 in FIG. 7).

As further shown, the main housing 14 can include an outward oriented or facing interior ledge 71 configuration, this further defining an interior pocket (again at 74 in FIG. 13) for supporting the planetary gear 20 in combination with an inner circumferential ring gear profile (see ring gear teeth 72 as best shown in FIG. 6) for inter-engaging the teeth (further shown at 73) of the planetary gear 20. As best shown in FIG. 13, the ledge 71 includes a partial arcuate profile and can exhibit a smooth inner diameter 76 allowing for clearance of the spur gear 20 to rotate but still be properly positioned and supported by the ledge 71 and so that, in combination with the inner circumferential ring gear teeth 72 of the knob handle interior incorporated and circumferentially extending ring gear 72 support the planetary gear 20 in a limited orbital displacing fashion within the assembly interior and so that the magnet 22 supported at a lower stem mounted end of the planetary gear is caused to rotate/displace a limited range relative to the PCBA mounted sensor (see again at 70 FIG. 7) in order to facilitate a microprocessor portion of the PCBA 18 to issue a vehicle shift change instruction.

Figure 7:
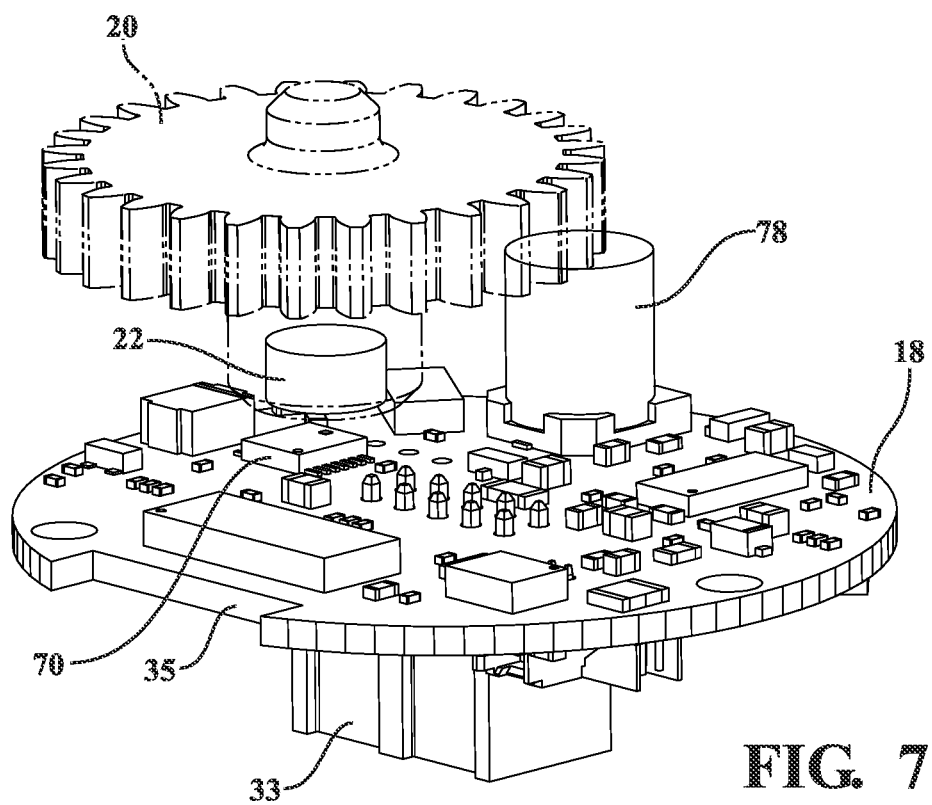
FIG. 7 is a further side rotated and sectional perspective depicting the ASM gear and bottom interior mounted magnet arranged proximate a sensor integrated into the PCBA.

FIG. 6 is a further sectional and downward looking perspective of with other parts removed and showing the annular interior with ring gear profile 72 of the rotatable and knob shaped handle 12, and further depicting the single bump actuating portion (stem 44 and wings 46/48), in combination with the gear and PCBA 18. FIG. 7 is a further side rotated and sectional perspective depicting the ASM gear 20 and bottom interior mounted magnet 22 arranged proximate the sensor 70 integrated into the PCBA 18. Additional optional features can include a capacitor cap 78 associated with the PCBA 18 and which is used to assist with electronic power management.

FIG. 8 is an overhead plan illustration similar to that shown in FIG. 4 and showing the rotary shifter in a home position, with FIG. 9 providing a succeeding illustration to FIG. 8 and depicting the handle assembly being rotated in a clockwise direction (arrow 79) so that the inner protuberances 60 and 62 of the handle abut a pair of first end stop locations 81/83 of the slots 64/66 configured in the main housing, and concurrent with the rotary engagement of the spring actuating portion (leg 50) by the associated wing 46 of the interior arcuate extending stem portion 44 of the knob 12. FIG. 10 is an alternate succeeding illustration to FIG. 8 and depicting the handle assembly being rotated in a counter clockwise direction (arrow 85) so that inner protuberances 60/62 of the handle abut additional end stop locations configured in the interior slots 64/66 of the main housing, this concurrent with the rotary engagement of the spring actuating portion 52 by the other inner extending wing portion 48 and in a counter direction to that depicted in FIG. 9 and until the inner protuberances 60/62 abut a second pair of opposite end stop locations 87/89 of the slots 64/66.

Figure 11:
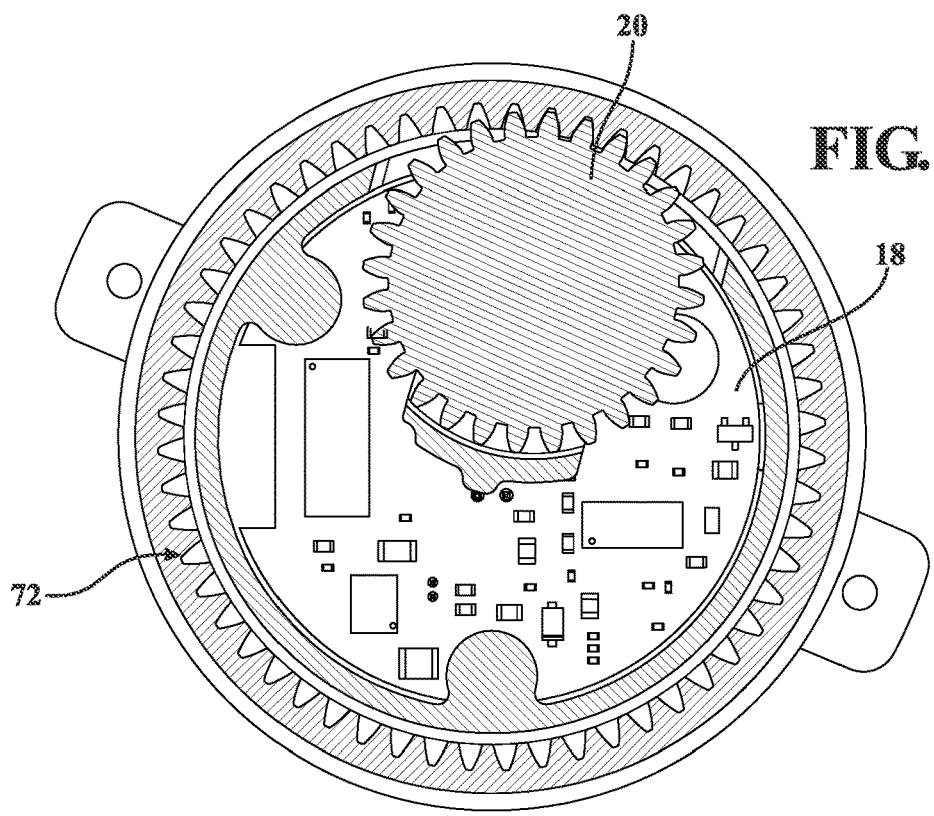
FIG. 11 is an overhead plan view of the inter-engagement of the planetary gear and handle assembly interior annular configured and integrated ring gear.
Figure 12:
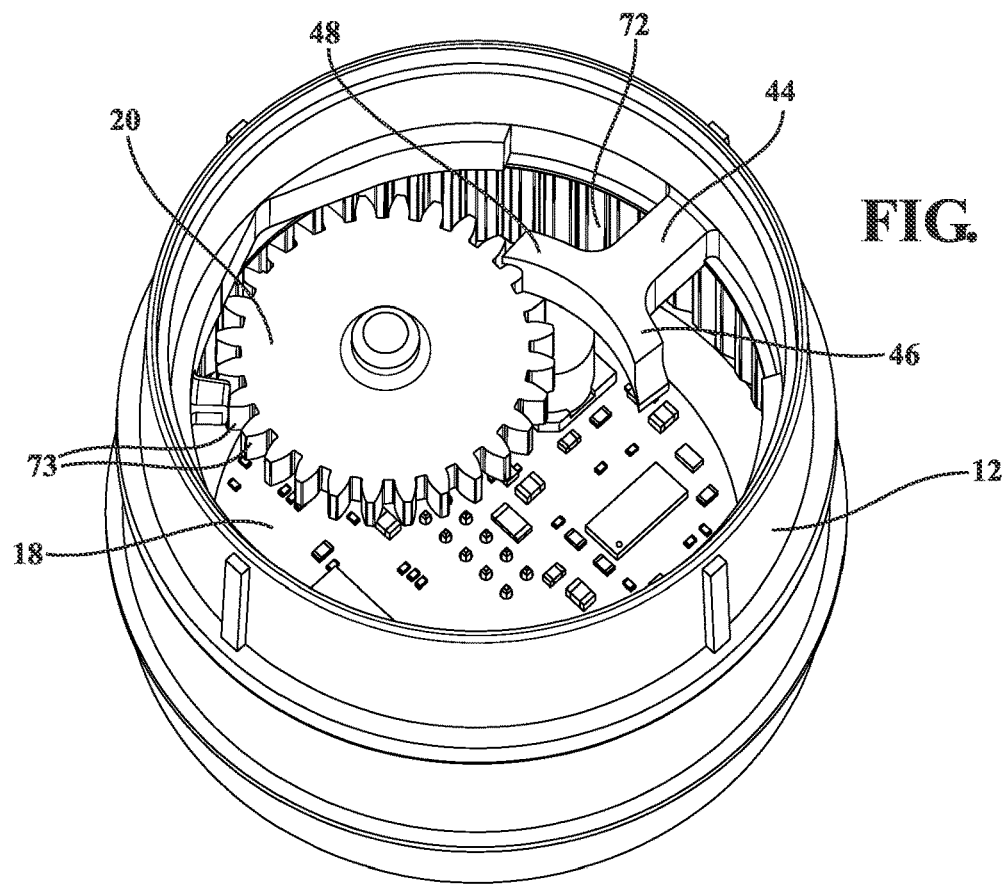
FIG. 12 is an illustration similar to that shown in FIG. 6 with parts removed and depicting the planetary gear and ring gear engagement from another angle.

FIG. 11 is a plan view cutaway of the knob assembly and housing and illustrating the inter-engagement of the planetary gear 20 and knob shaped handle 12 with the interior annular configured and integrated ring gear teeth 72. FIG. 12 again provides an illustration similar to that shown in FIG. 6 with parts removed and depicting the planetary gear 20 and ring gear 72 engagement from another angle.

Figure 31:
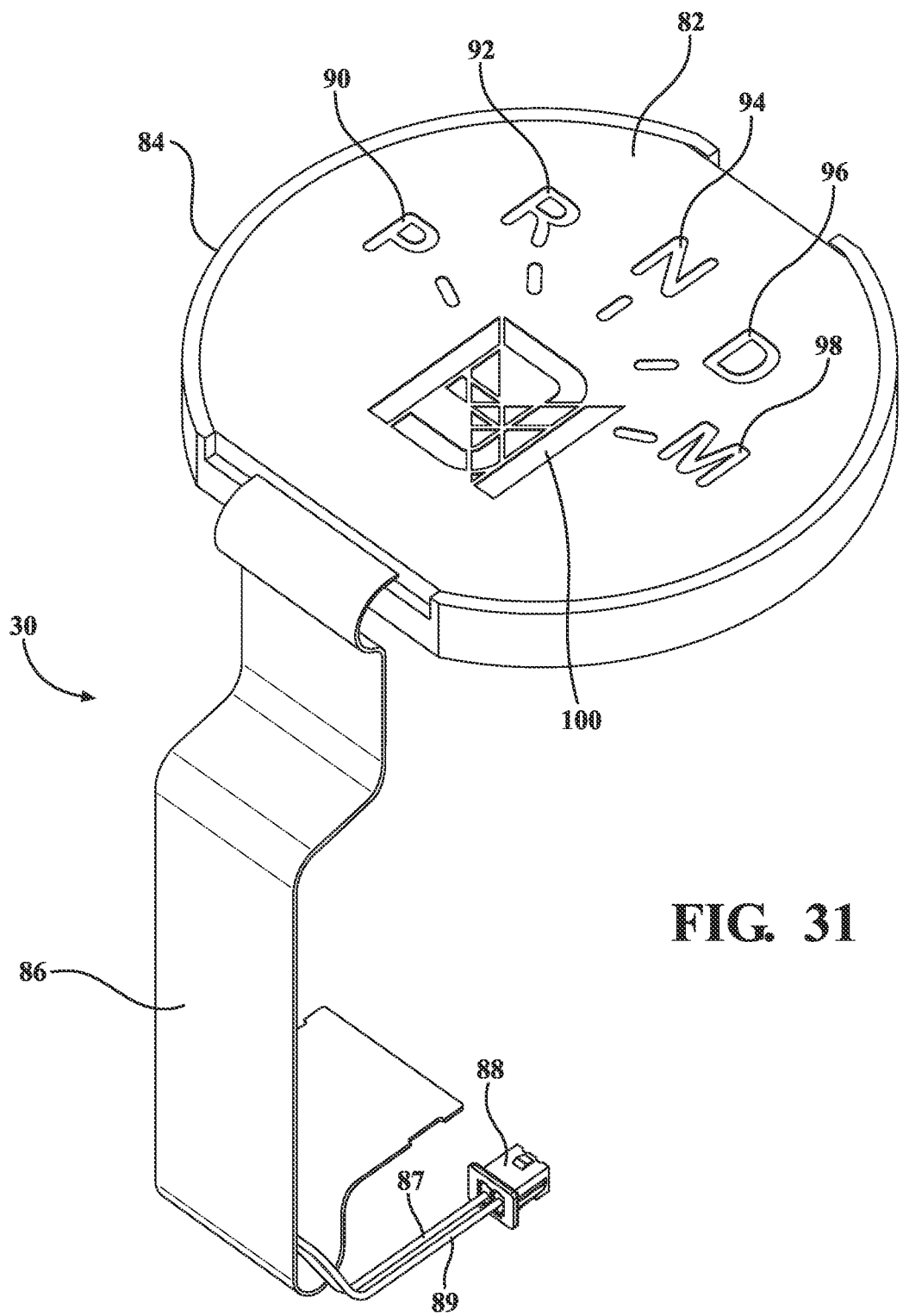
FIG. 31 is an illustration of a graphical display incorporated into the shifter of the present invention.

FIG. 31 is an illustration of the graphical display 30 incorporated into the present invention and which can include an illuminating component not limited to LED elements (not shown) integrated into a surface display for presenting a pixelated image. Alternatively, the illuminating component can include either of a thin film transistor display, an organic light emitting diode display or a segmented display including segmented LCD elements (likewise not shown) such as provided in combination with LED backlight elements.

A ribbon cable (as further described below at 86) extends from the display to a receiver location of the PCBA board assembly 18. A side notch 35 in the PCBA 18 facilitates passage of the ribbon cable to the PCBA 18. The ribbon 86 can include either integrated or separate power lines for operating the display, including illuminating the various shifter positions as identified for each of Park, Reverse, Neutral, Drive and Manual positions. Other features can include an illuminating component associated with the graphical display further including any of LED elements and/or LCD segments integrated into a surface display for presenting a pixelated image. The illuminating component can include any of thin film transistor, organic light emitting diode or segmented display options, such including the segmented LCD elements such as provided in combination with LED backlight elements.

A closeout display is provided and encloses a display subassembly display surface 82 (this can also reference the surface bezel 42 identified in FIG. 2) and a surrounding frame housing 84. A lens (not shown) can also be provided for covering the display surface 82 in a manner which transparently reveals and protects the pixelated or segmented image provided by the display surface.

The graphical display communicates with the PCBA 18, such as via a main microcontroller on the main PCBA via such as a serial communication protocol (LIN, SPI, 12C, etc.). Alternatively, a parallel interface is envisioned between the main microcontroller/PCB and the graphic display in substitution for the above listed serial communication options. In such an application, the main microcontroller/PCB to graphic display interface will initially be parallel, with the ribbon style cable (again at 86) extending from the graphic display and connecting into an input location for the PCB using the appropriate mating connector 88 which engages to a separate location on the PCBA 30 apart from the main underside connector 33 for connection to the vehicle.

In a segmented display configuration, the a separate wire set (at 87 and 89 associated with the separate connector 88) is provided for managing the LED[]s to the separate connector on the PCBA 18, with the ribbon 86 managing the segments to the separate connector receiving. In a TFT/OLED configuration, a single ribbon (such as again shown at 86) is provided with the power lines included and which connects to the single location on the PCBA.

As further understood, the ribbon cable will have a wire for each individual LED/LCD segment controlled by the main microcontroller and so that subset areas of the display surface are illuminated based upon the collection of outputs provided from the PCBA 18. Regardless of the type of graphic display employed, the display surface 82 will exhibit a desired arrangement of symbols which, in the illustrated embodiment, include an outer array of menu shifter positions (Park 90, Reverse 92, Neutral 94, Drive 96 and Manual 98), this in combination with a central enlarged graphical depiction which is provided by the display of a selected one of the shifter positions (see by example for Drive as depicted at 100).

Having provided a structural description of the components of the variant 10, additional description will now be had of the operating protocols for providing each of successive and single shift position shifting between each of the PRNDM gear positions according to the monostable functionality of the gear shifter in single position twist and release in either of the clockwise or counter-clockwise directions (corresponding to one bump operation of the rotary shifter), this in combination with rotate and hold direct shift functionality, such as for shifting directly from Park to Drive and Drive to Park positions.

Figure 14:
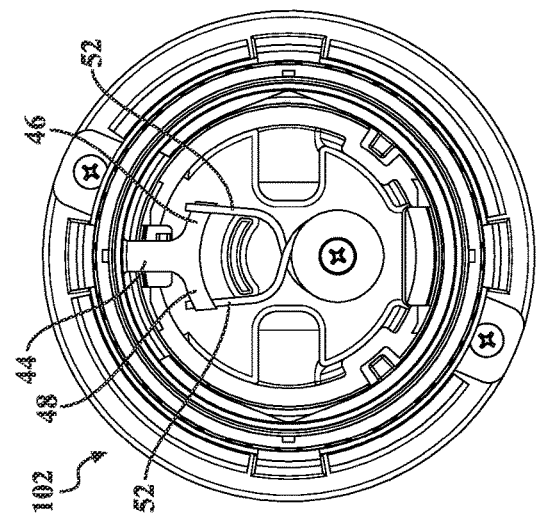
FIGS. 14 and 15 provide a pair of overhead views of the assembly in the home position of FIG. 8.
Figure 15:
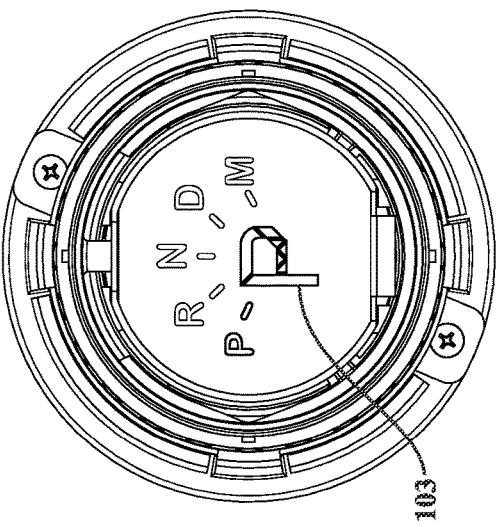
Figure 16:
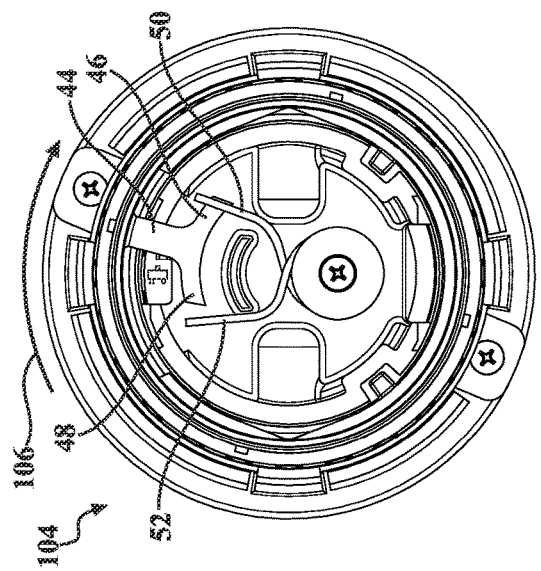
FIGS. 16 and 17 provide a succeeding pair of overhead views of the assembly as shown in FIG. 9 in the clockwise monostable actuated position for shifting from Park to Reverse position.
Figure 17:
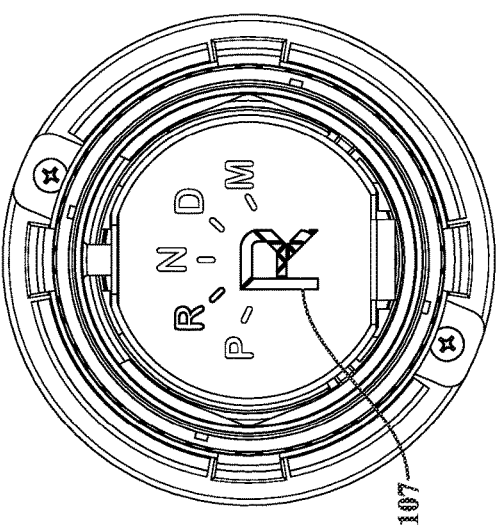
Figure 18:
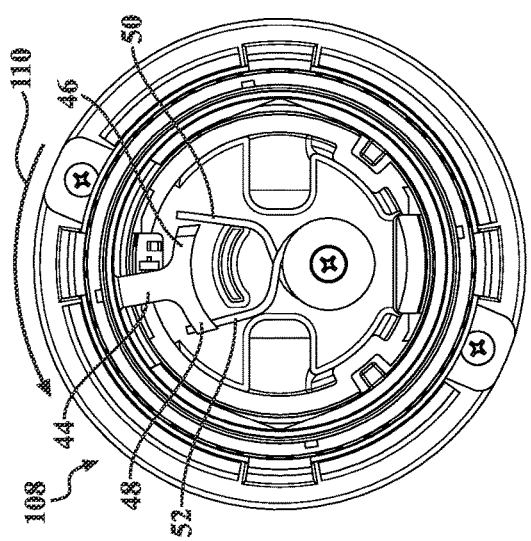
FIGS. 18 and 19 provide a further succeeding pair of overhead views of the assembly as shown in FIG. 10 in the counter clockwise monostable actuated position for shifting back to the Park position.
Figure 19:
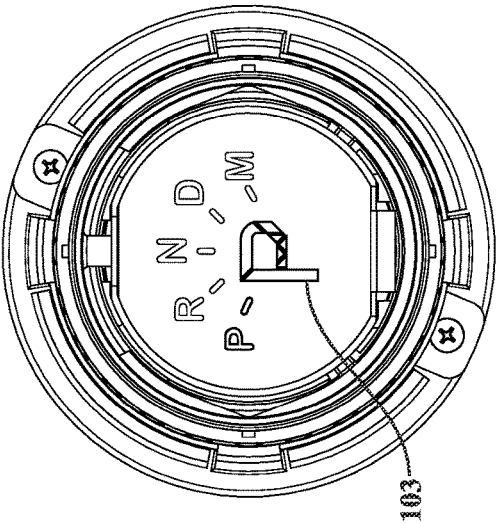

FIG. 14 provides an overhead view 102 of the assembly in the home position of FIG. 8, with FIG. 15 subsequently depicting the graphical display installed in the same home position and a central enlarged depiction 103 referencing the shifter in the Park position. FIGS. 16 and 17 provide a succeeding pair of overhead views 104 of the assembly as shown in FIG. 9 in the clockwise monostable actuated position (see arrow 106) for shifting from Park to Reverse shifter positions (further referenced in FIG. 17 by enlarged depiction 107 for Reverse). FIGS. 18 and 19 provide a further succeeding pair of overhead views 108 of the assembly as shown in FIG. 10 in the counter clockwise monostable actuated position (arrow 110) for shifting back to the Park position. In each instance, monostable one bump operation (i.e., return to center positioning) of the shifter knob 12 is provided by the dual action torsional spring 24 for providing shift resistance to the inner arcuate extending portion (stem 44 and wings 46/48) of the knob shifter 12.

Figure 21:
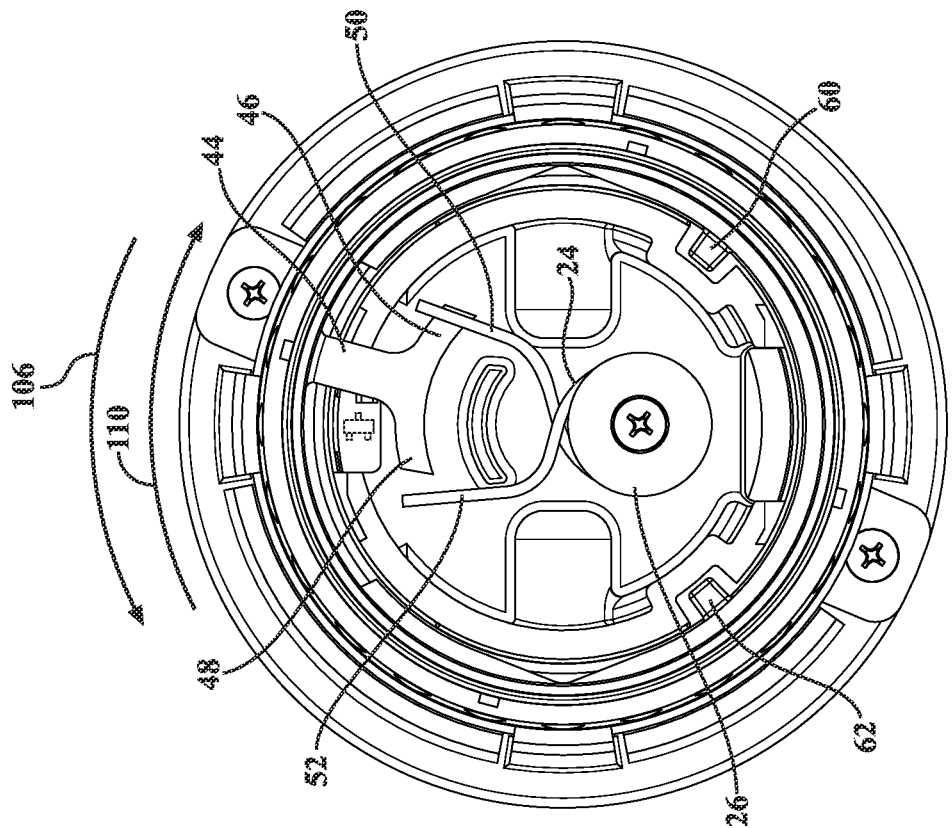
Figure 20:
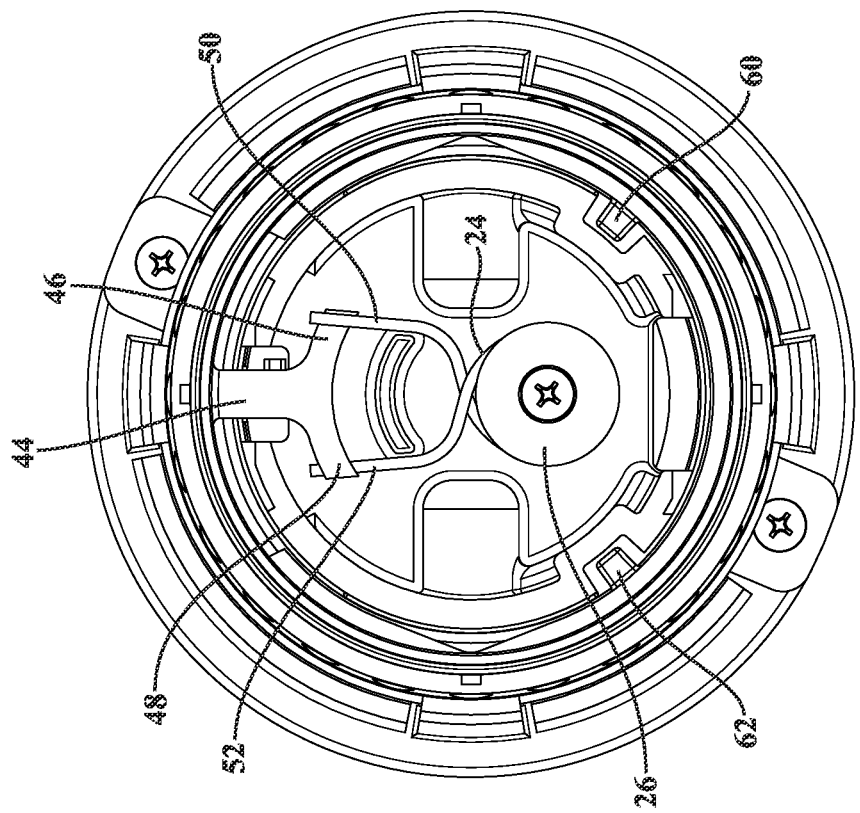
FIG. 20 is a repeat overhead view of the assembly in the home position with FIG. 21 subsequently depicting either of the cw or ccw directed monostable actuation of the rotary shifter.
Figure 22C:
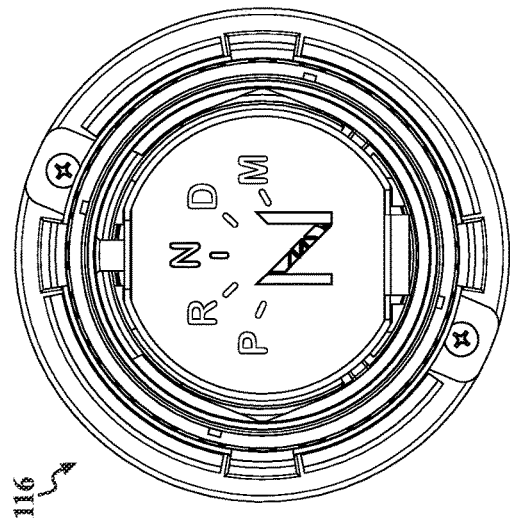
FIGS. 22A-22E depict a series of illustrations of the single bump operation of the rotary shifter between each of Park, Reverse, Neutral, Drive and Manual operating gear positions.
Figure 22B:
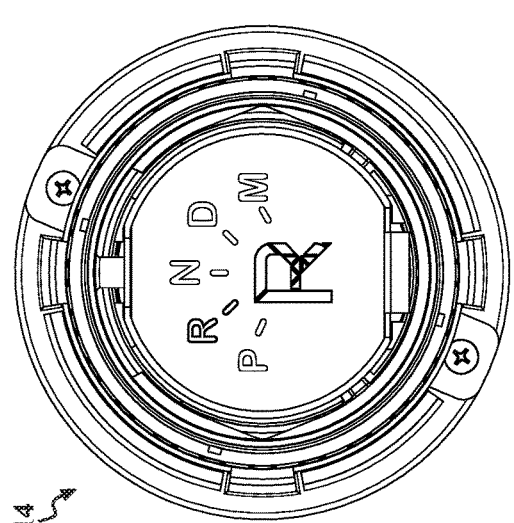
Figure 22A:
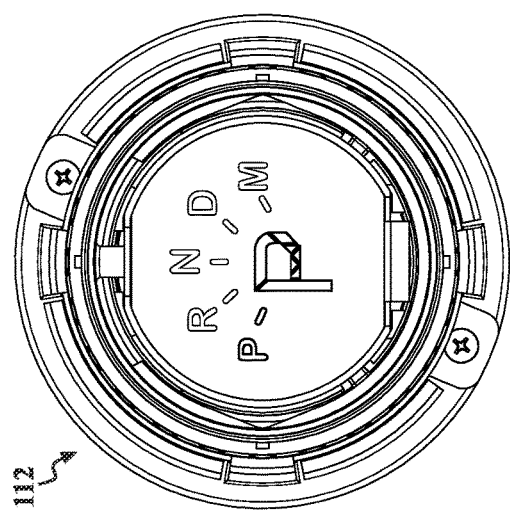
Figure 22E:
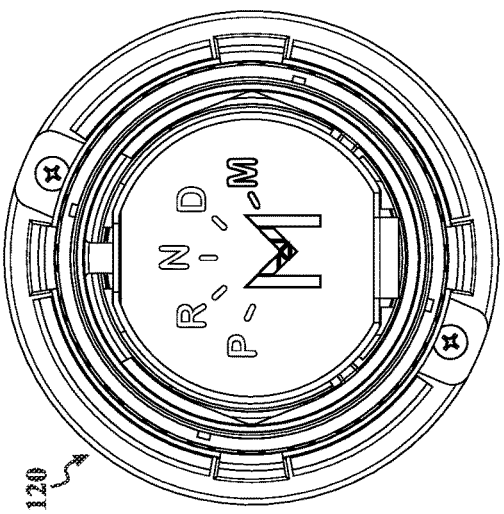
Figure 22D:
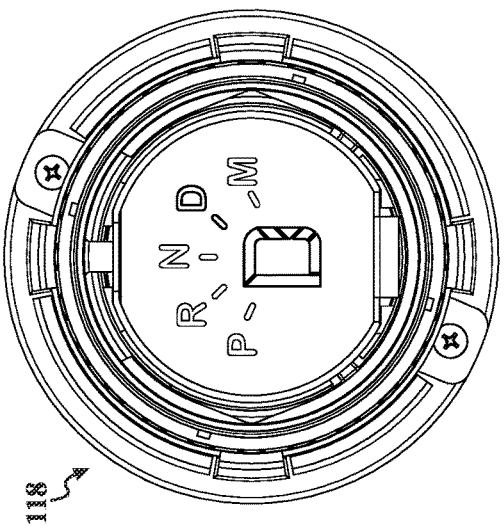

FIG. 20 is a repeat overhead view of the assembly in the home position, with FIG. 21 subsequently depicting either of the cw or ccw directed monostable actuation of the rotary shifter as previously described in FIGS. 16-17 and 18-19. This is again provided by one bump or mono stable rotation of the knob 12 and by which the forced deflection of the selected torsion spring leg 50/52 occurs simultaneous with the inner protuberances 60/62 of the knob contacting the selected end-stop abutment locations of the slots 64 and 66 (again FIG. 9).

In this manner, rotation of the knob 12 (such as in the clockwise direction) and subsequent release will cause the torsion spring to return the knob or handle to the home position, with the display indicating the next succeeding gear position from PRNDM. Rotation of the knob 12 in the counterclockwise direction further causes reverse shifting according to the above protocol.

Proceeding to FIGS. 22A-22E, depicted are a series of illustrations of the single bump operation of the rotary shifter between each of Park 112 (FIG. 22A), Reverse 114 (FIG. 22B), Neutral 116 (FIG. 22C), Drive 118 (FIG. 22D) and Manual 120 (FIG. 22E) operating gear positions. Again, a monostable (single bump) operation is provided in a clockwise direction for achieving each succeeding gear, with similar operation in a reverse (counter clockwise) direction causing return shifting in an opposite direction).

Figure 24:
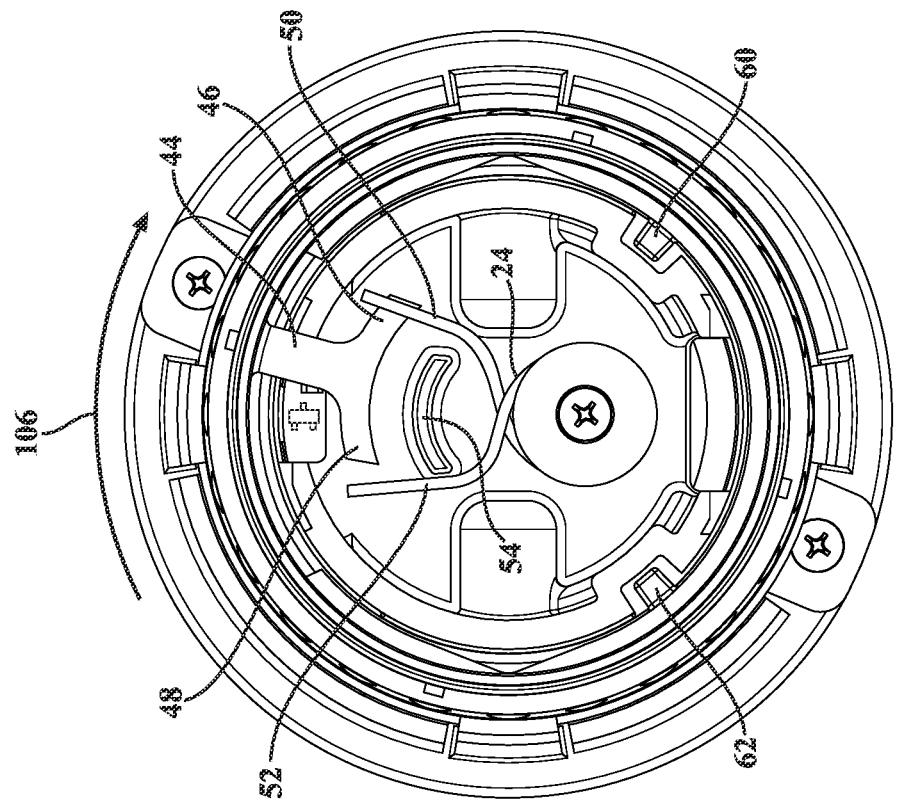
FIG. 24 is an illustration of the shifter rotated cw to the end stop position and held for a determined period of time (e.g. greater than two seconds) for accomplishing a direct shift operation according to the present invention.
Figure 23:
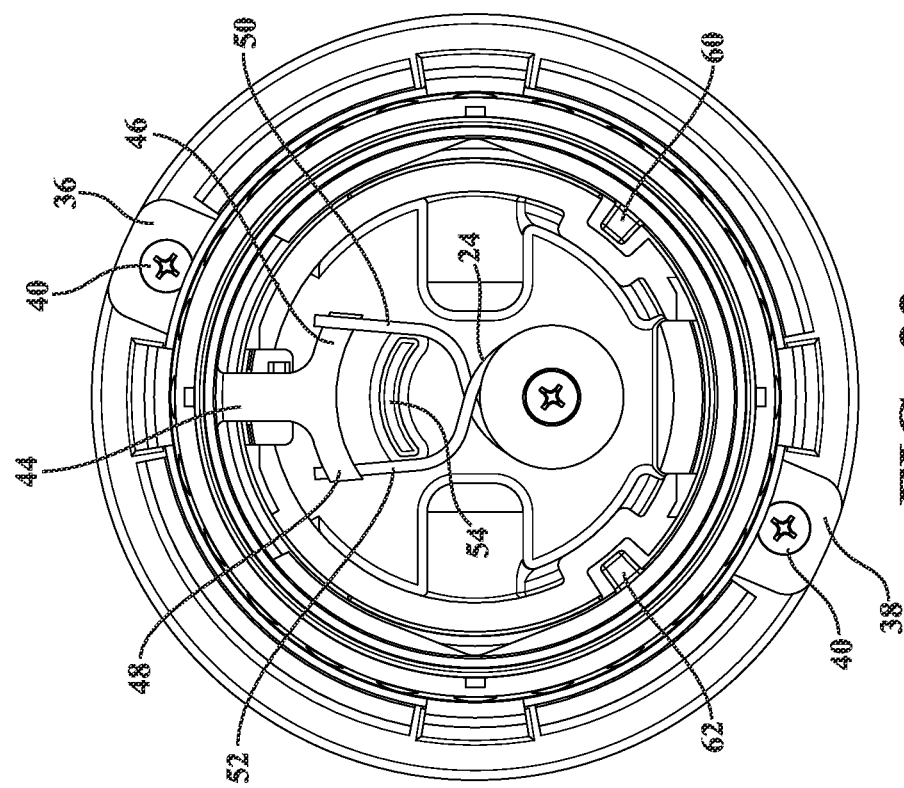
FIG. 23 is repeat illustration of the shifter in the home position of FIG. 3.
Figure 26B:
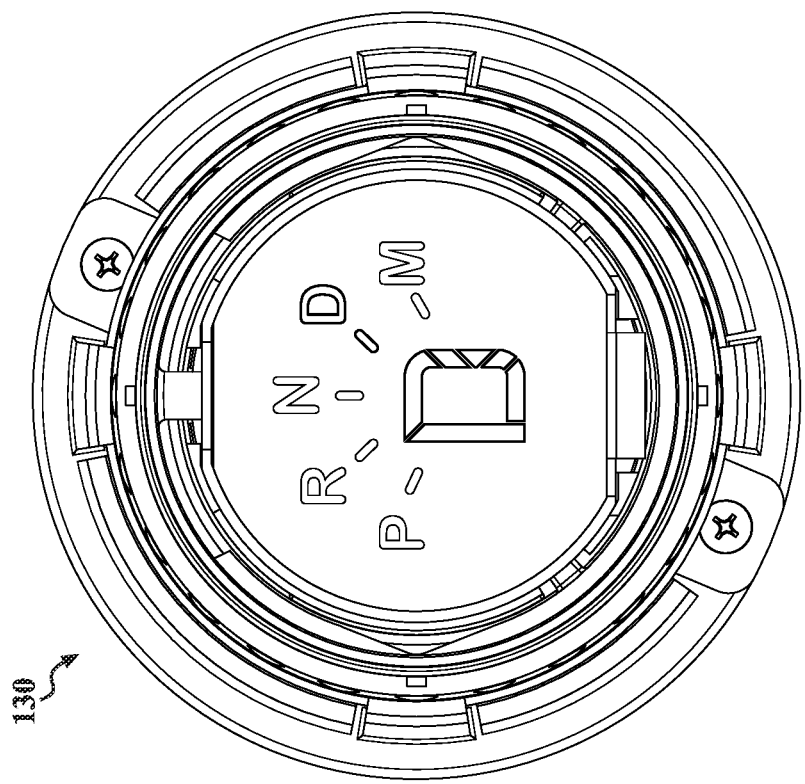
FIGS. 26A-26D further illustrated a succession of Reverse to Drive to Manual to Park shifter positions provided by the direct shift operation.
Figure 26A:
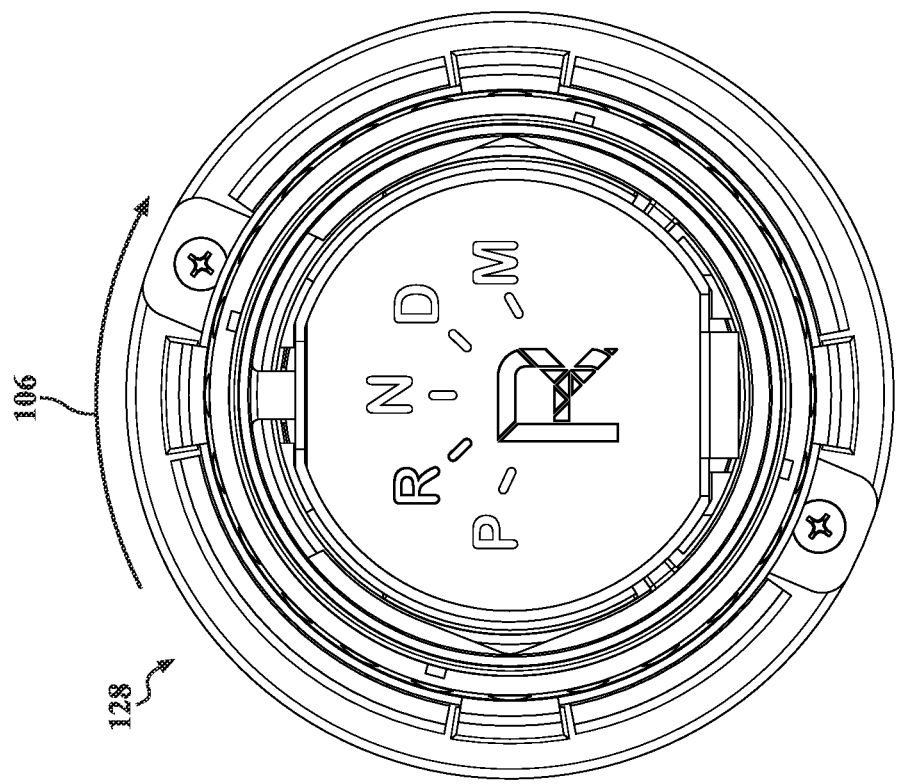
Figure 26D:
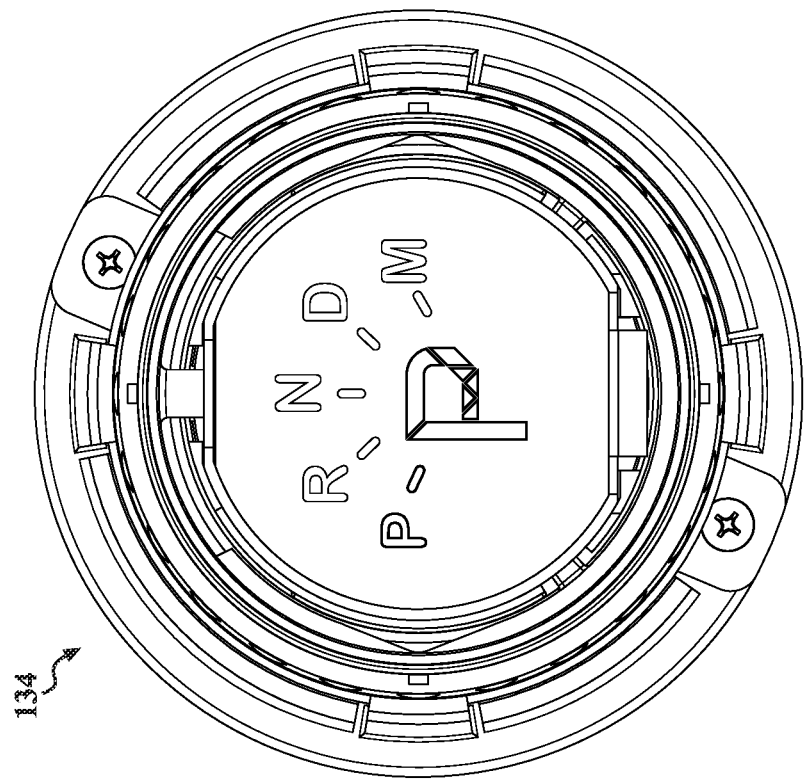
Figure 26C:
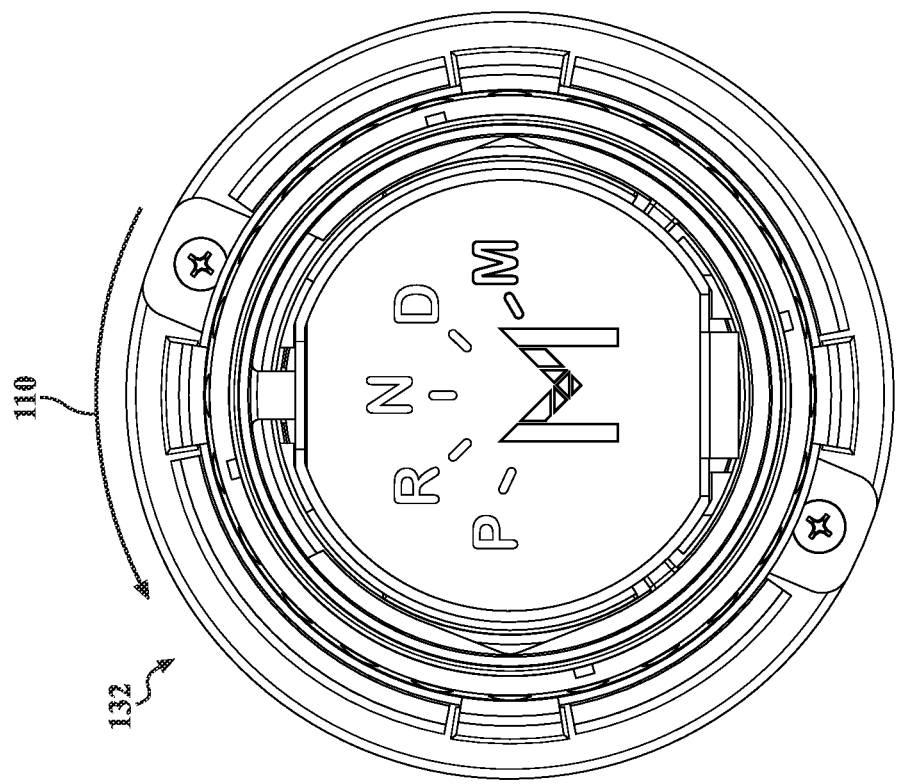

FIG. 23 is a repeat illustration of the shifter in the home position of FIG. 3, with FIG. 24 providing an illustration of the shifter rotated clockwise (see again arrow 106) to the end stop position and held for a determined period of time (e.g. such as greater than two seconds) for accomplishing a direct shift operation according to a further operational feature of the present invention. FIGS. 25A-25C illustrate a succession of Park 122 to Drive 124 and return to Park 126 shifter positions provided by the direct shift operation, with FIGS. 26A-26D further illustrating a succession of Reverse 128 to Drive 130 to Manual 132 to Park 1234 shifter positions provided by the direct shift operation, and again by which the handle/knob 12 is rotated either cw 106 or ccw 110 and held for a non-limited and sustained period of time, such as which can include two seconds (200 milliseconds) or longer such as 500 milliseconds, such time being customer dependent based on the individual desire from the vehicle team.

Figure 28:
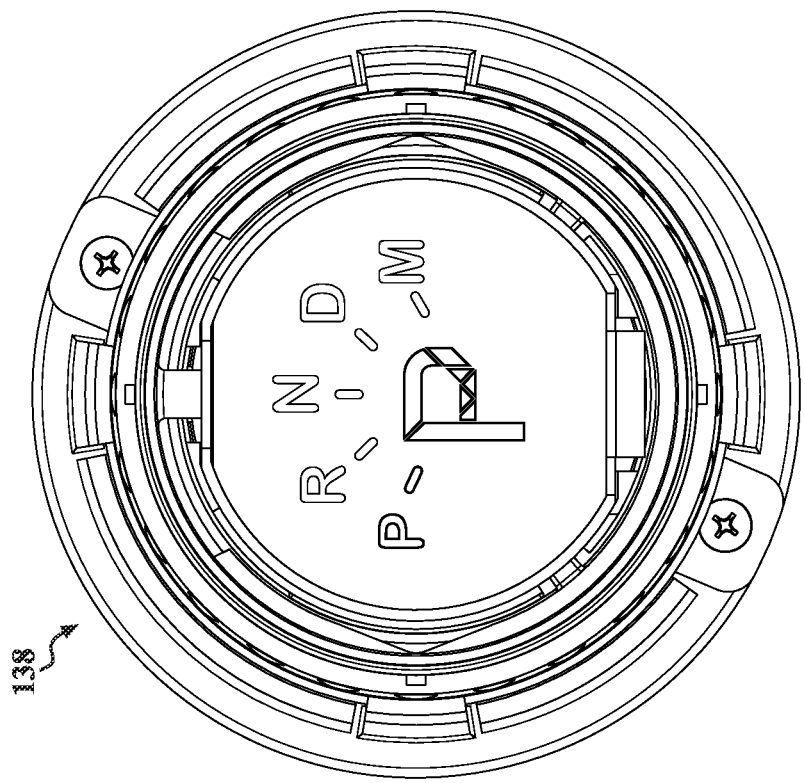
FIG. 28 is a succeeding illustration to that shown in FIG. 27 of the shifter display returned to the Park position.
Figure 27:
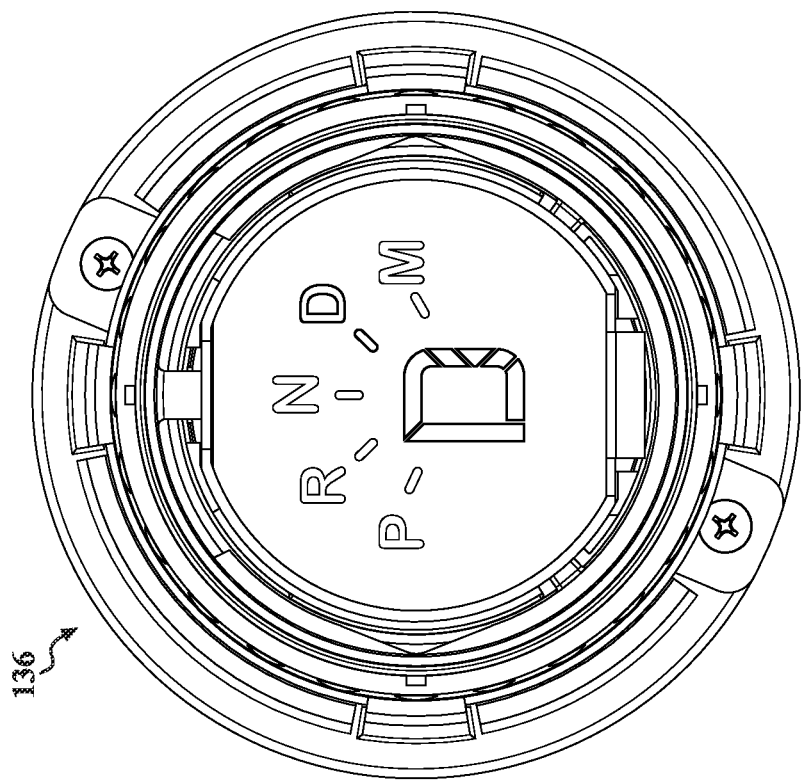
FIG. 27 is a first shift indication feature for returning the shifter assembly to the Park position from any gear upon command.

FIG. 27 provides a representation 136 of an electronic return to park feature for returning the shifter assembly to the Park position from any gear upon command, with FIG. 28 providing a succeeding illustration 138 to that shown in FIG. 27 of the shifter display returned to the Park position. Unlike the preceding described embodiments, the return to park (RTP) protocol operates separately from the monostable one-bump or direct shift functionality and can result from an external sensor located in the vehicle sending an input to the PCBA mounted processor (such as in response to a vehicle door being opened, seatbelt not engaged, etc.) for in turn putting the vehicle in the Park position 138.

Figure 30:
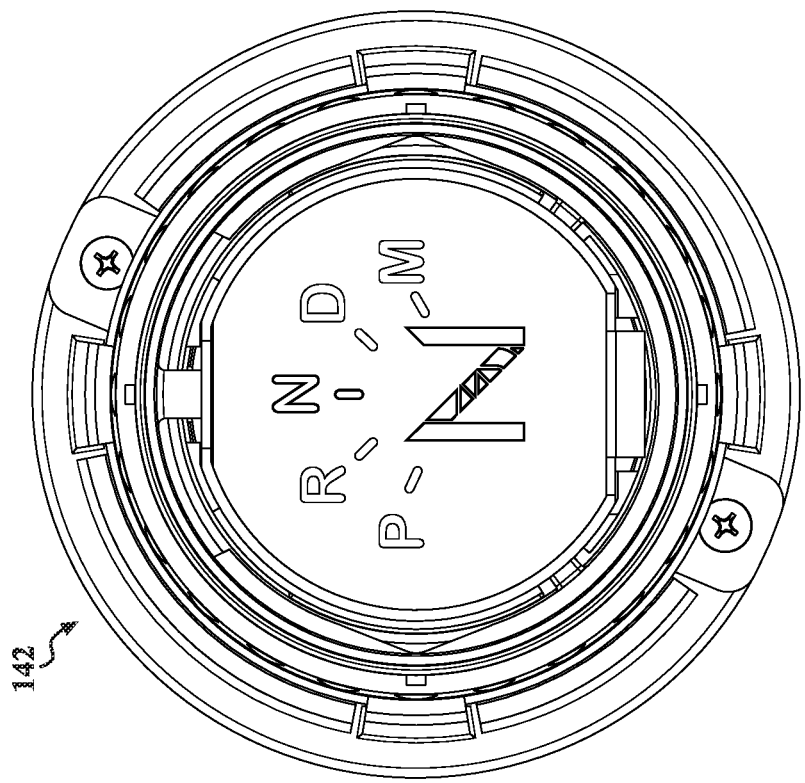
FIG. 30 is a Neutral Lock illustration corresponding to the functionality described in FIG. 29.
Figure 29:
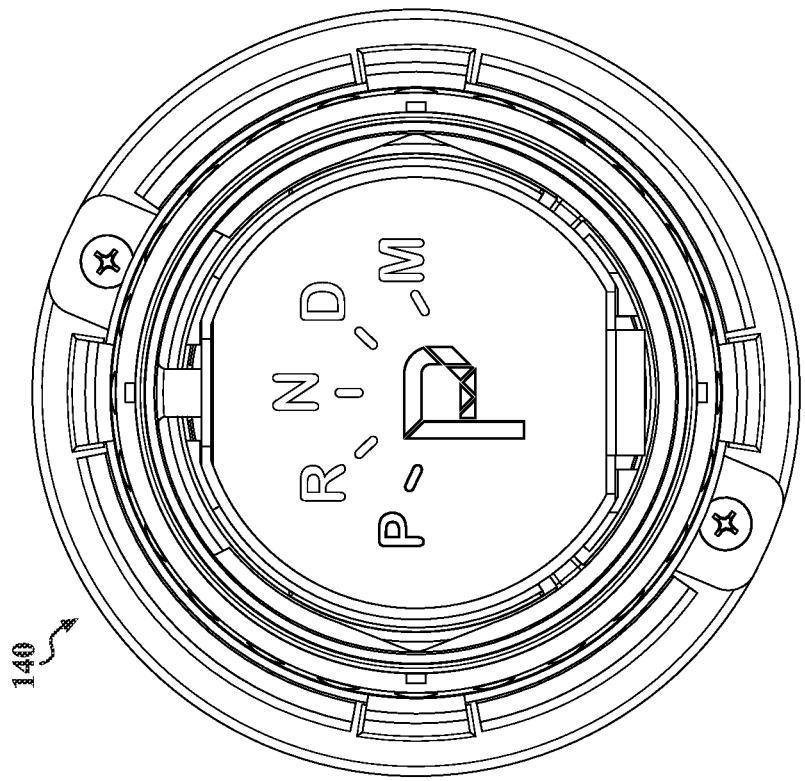
FIG. 29 is a Park Lock illustration corresponding to an operator being required to depress the brake pedal to release the assembly from the Park position and such as in which the handle assembly can move but the gear remains in the Park position.

FIG. 29 is a Park Lock illustration, generally at 140 corresponding to an operator being required to depress a vehicle brake pedal (not shown) to release the assembly from the Park position, and such as in which the handle assembly can move but the gear position remains in the Park position. FIG. 30 is a Neutral Lock illustration 142 corresponding to the functionality described in FIG. 29, and by which the shifter will maintain the neutral gear upon command given by an operator and in which, notwithstanding the handle assembly (knob 12) being rotated, the gear position remains in Neutral.

Figure 33:
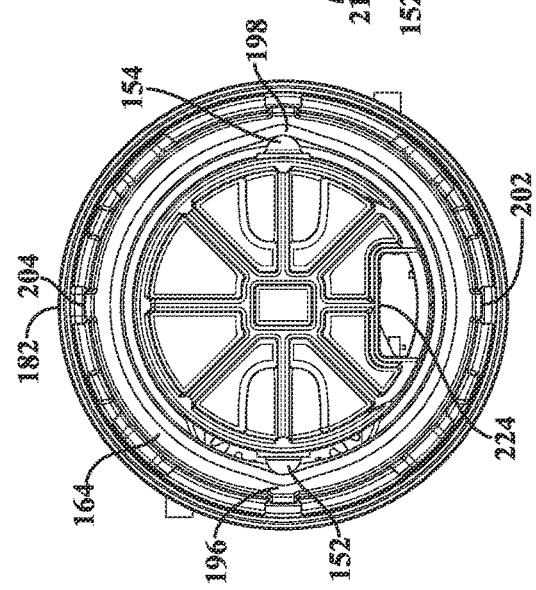
FIG. 33 is a top plan cutaway view through the handle assembly and showing the spring loaded pawls engaging the lower handle in the home position.
Figure 35:
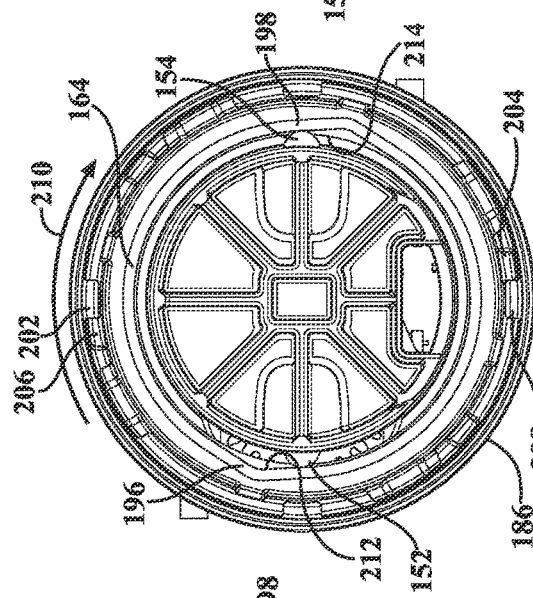
FIG. 35 is a top plan cutaway view similar to FIG. 33 and depicting the handle being rotated in a clockwise direction and corresponding to the spring loaded pawls interfacing with a first set of sloped surfaces configured upon an inner circumference of the handle.
Figure 37:
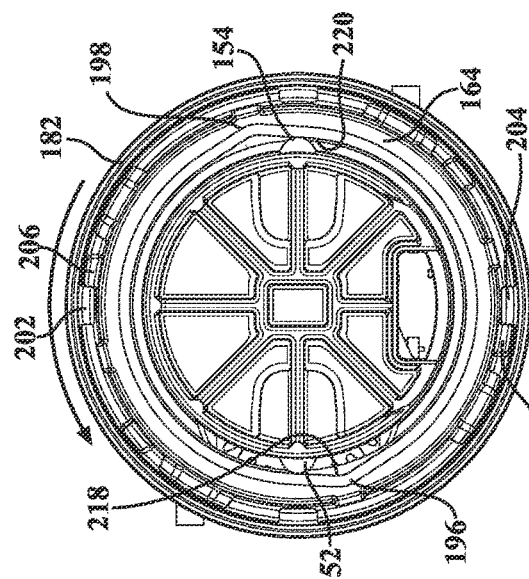
FIG. 37 is a top plan cutaway view similar to FIG. 33 and depicting the handle being rotated in a counter-clockwise direction and corresponding to the spring loaded pawls interfacing with a second set of sloped surfaces configured upon an inner circumference of the handle.

Proceeding to FIG. 32, an exploded view is again shown at 150 of the rotary shifter according to a further embodiment of the present invention and which substitutes the return to center torsion spring 24 of FIG. 1 with a pair of pawls 152 and 154 and corresponding coil springs 156 and 158 which are integrated into a redesigned main housing 160 (these as will further described in FIGS. 33, 35 and 37 abutting opposing sloping surfaces defined upon an inner circumferential profile of a rotatable handle in order to influence the handle to the center position when released). The main housing 160 also defines a perimeter defining window 161 from which partially projects the spur gear, again shown at 20 with end supported magnet 22 and outward meshing teeth 73.

In comparison to that shown in FIG. 1, a number of redesigned components are provided and include a two piece handle assembly with an upper handle component 162 and a lower assemble-able handle component 164. The upper component 162 can again exhibit a knurled exterior gripping profile 166 along with circumferential cutout location 168 which, upon assembly, seat annular rim protuberances 170 of the lower handle component 164. As previously described, the handle or knob can be provided as a single piece as shown at 12 in the first variant of the assembly 10.

A redesigned display component 172 includes a ribbon connector 174 (see also as previously described in FIG. 31) which connects to the PCBA 18. Reference is also made to the preceding description regarding alternate design options for TFT/OLED or segmented display variations for the graphic display component.

An outer housing 176 is provided with lower engagement tabs 178 for assembling over projecting locations 180 associated with an annular outer base portion 182 of the main (inner) housing 160. A redesigned lower housing cover 184 receives fasteners 186 for securing to the annular bottom of the outer housing 176 and inner main housing 160 and in order to sandwich therebetween the PCBA 18. A chrome ring 188 (or other decorative finishing) secures the upper display surface 172 of the graphic display component to the upper handle component 162. The ring 188 includes annular spaced clips 190 which seat within a circular recess or trough 192 defined within the surface of the upper handle component 162 for securing the display surface. A transparent lens 193 can be integrated into the top surface of the upper rotatable handle component 162 and beneath which is positioned the graphic display component 172.

As an alternate option to the torsional spring 24, the pawls 152/154 and associated pawl springs 156/158 seat within apertures (one of which is shown at 194 in FIG. 32) defined within the annular wall of the main housing 160. The interior of the main housing 160 further includes a pair of pockets for receiving the springs 156/158 and for seating the pawls 152/154 and so that only a sloping exterior portion of the pawls 152/154 project radially outwardly from circumferential exterior of the main housing.

Figure 34:
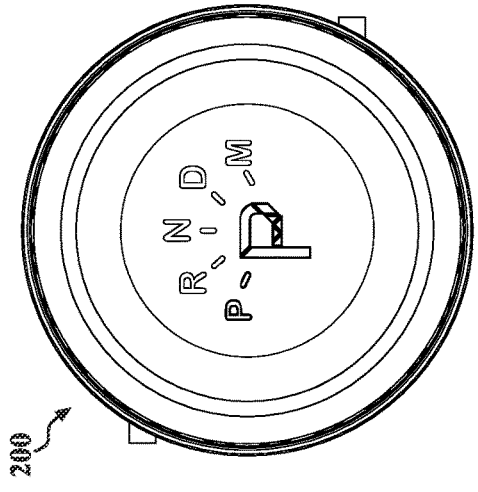
FIG. 34 is a corresponding top plan view to FIG. 33 depicting the shifter display in the Park position.

FIG. 33 is a top plan cutaway view through the handle assembly and showing the spring loaded pawls 152/154 engaging the inter-assembled lower handle component 164 in the home position. This corresponds to the Park position 200 referenced in FIG. 34.

As previously described, the lower handle component 164 includes abutting opposing sloping surfaces (see as depicted in non-limiting fashion as one hundred and eighty degree offset peaked profile locations 196 and 198), these defined upon an inner circumferential profile of the lower knob component 164. Regardless of the direction of rotation imparted by rotation of the handle component 164, the projecting locations of the pawls 152/154 are compressed and, upon being released, the handle/knob assembly is return rotated to the center position.

A pair of redesigned inner protuberances 202/204 (compare to as shown at 60/62 in the first variant) are provided with the knob component 164 and displace relative to offset opposing end stops 206/208 defined in the main housing 160 and so that, depending upon the direction of rotation of the knob, the protuberances 202/204 can only display a limited degree until abutting contact is established. Other variants can envision the spring loaded pawls 152/154 being redesigned to incorporate any end stop structure, such as which can be done without the need for separate protuberances and arcuate defined end stops, in order to define the limits of mono stable rotation of the knob 164.

Figure 36:
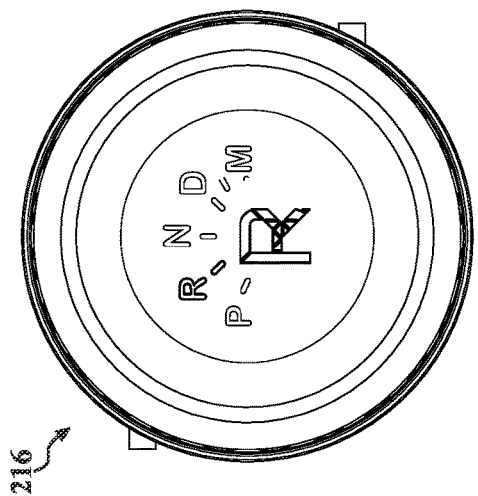
FIG. 36 is a corresponding top plan view to FIG. 35 depicting the shifter display in the Reverse position, with successive one bump clockwise displacements adapted to progressively shift the display through each of the Neutral, Drive and Manual positions.

FIG. 35 is a top plan cutaway view similar to FIG. 33 and depicting the handle/lower knob component 164 being rotated in a clockwise direction (arrow 210) and corresponding to the spring loaded pawls 152/154 interfacing with a first subset set of communicating sloped surfaces 212/214 associated with the peaked locations 196/198 configured upon an inner circumference of the handle. FIG. 36 is a corresponding top plan view to FIG. 35 depicting the shifter display in the Reverse position 216, with successive one bump clockwise displacements adapted to progressively shift the display through each of the Neutral, Drive and Manual positions.

Figure 38:
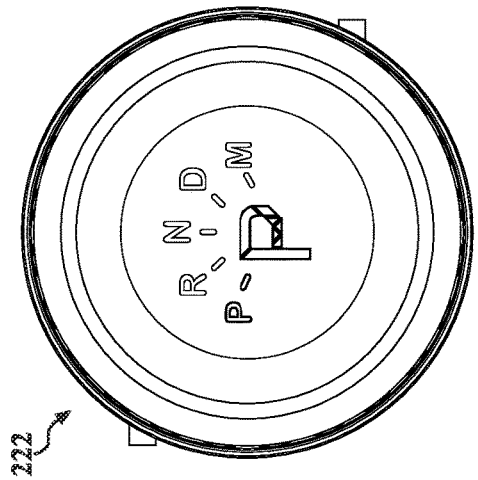
FIG. 38 is a corresponding top plan view to FIG. 37 depicting the shifter display returned to the Park position.

FIG. 37 is a top plan cutaway view similar to FIG. 33 and depicting the handle/lower knob component 164 being rotated in a counter-clockwise direction, this corresponding to the spring loaded pawls 152/154 interfacing with a second set of communicating sloped surfaces 218/220 configured upon an inner circumference of the lower handle/knob component 164. FIG. 38 is a corresponding top plan view to FIG. 37 depicting the shifter display returned to the Park position 222. Each of FIGS. 33, 35 and 36 further depict a cutout location (see at 224 in FIG. 33) for permitting passage therethrough of the display component ribbon 174 connected to the PCBA 18.

Figure 39:
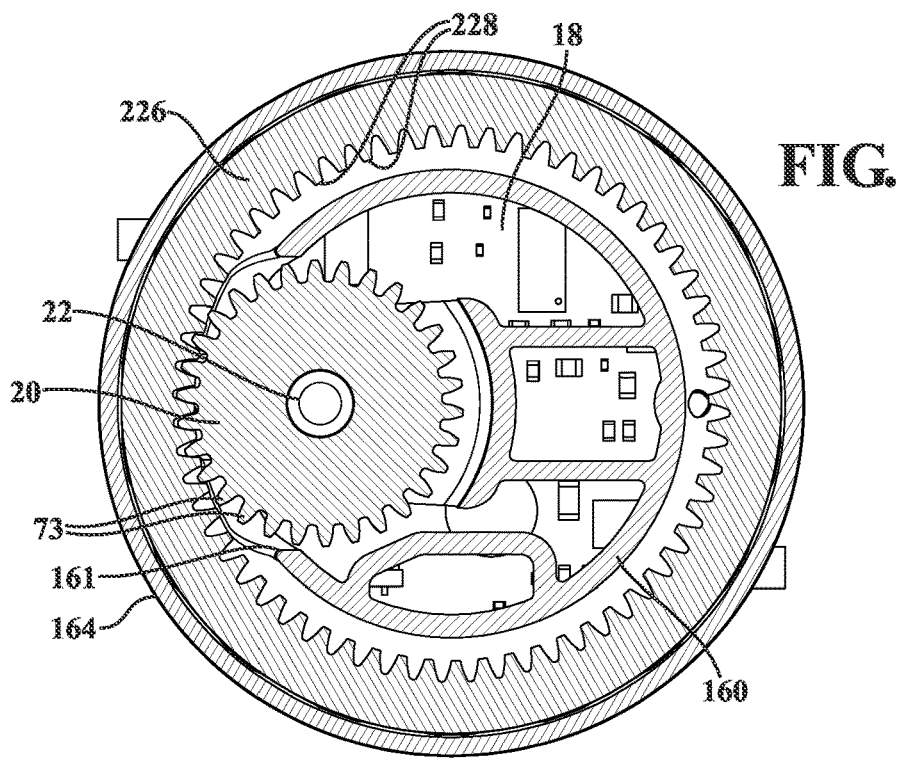
FIG. 39 is a top plan cutaway view taken along line 39-39 in FIG. 32 and illustrating the inside of the handle assembly including the ring gear configured upon an lower circumference of the handle which interfaces with and rotates the spur gear with end supported magnet, with rotation of the magnet relative to the PCB mounted sensor being communicated to the processor for instructing a shifter position change.

FIG. 39 is a top plan cutaway view taken along line 39-39 in FIG. 32 and illustrating the inside of the handle/rotatable knob assembly including a similar ring gear 226 configured upon an lower circumference of the rotatable lower knob or handle component 164. The ring gear includes inner teeth 228 which interfaces with and rotates the spur gear 20 with end supported magnet 22, with rotation of the magnet relative to the PCB mounted sensor (again at 70 in FIG. 40) being communicated to the processor associated with the PCBA 18 for instructing a shifter position change.

FIG. 40 is a side or height extending cutaway of the assembled shifter of FIG. 32 and illustrating the ASM spur gear 20 and magnet 22, and PCBA mounted sensor 70.

In this manner, the present invention according to either of the variants 10 and 150 discloses an effective assembly for providing operator interface for a transmission gear selection as well as haptic operator feedback (i.e. through the shift resistance architecture), while shifting through the gear positions in any of monostable or direct gear shifting operations as previously described. Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The foregoing disclosure is further understood as not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosure. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as []including[], []comprising[], []incorporating[], []consisting of[], []have[], []is[] used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, []first[], []second[], []third[], []primary[], []secondary[], []main[] or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application. Additionally, any signal hatches in the drawings/figures should be considered only as exemplary, and not limiting, unless otherwise specifically specified.

We claim:

1. A rotary shifter assembly, comprising:
a knob bi-directionally and biasingly supported upon a cylindrical shaped housing in a monostable and return-to-center orientation and including a pair of outwardly spring biased pawls;
said knob including upper and lower assembleable components, said lower assembleable component having inner sloped surfaces with peaked locations opposing said pawls for influencing said knob to said return-to-center orientation, said housing including a window;
a printed circuit board assembly incorporated into said housing and including a sensor and a processor;
a display component sandwiched between said upper and lower assembleable components and including a connector extending to said printed circuit board assembly;
a spur gear rotatably supported within said housing above said printed circuit board assembly and partially projecting through said window, said spur gear having a shaft portion supporting a magnet in proximity to said sensor;
said lower assembleable component integrating an inner circumferential ring gear located below said inner sloped surfaces, said inner circumferential ring gear exhibiting inner circumferential arrayed teeth which surround and meshingly interengage opposing exterior teeth of said spur gear projecting through said window;
rotation of said knob causing said ring gear to rotate said spur gear, with rotational displacement of said supported magnet relative to said sensor causing said processor to instruct said display component as to a change in shifter position.

2. The shifter assembly as described in claim 1, said cylindrical shaped housing further comprising a main housing secured upon a lower cover housing.

3. The shifter assembly as described in claim 2, said main housing further comprising an outward facing ledge for supporting said spur gear in combination with said inner circumferential ring gear.

4. The shifter assembly as described in claim 1, said biasing monostable and return-to-center orientation further including a shift resistance/bias being exerted against an actuation portion in response to either of clockwise or counter clockwise rotation in order to provide for shifting between each of Park, Reverse, Neutral, Drive and Manual shifter positions.

5. The shifter assembly as described in claim 4, an open interior of said knob further comprising inner protuberances formed in said lower assembleable component which seat within arcuate tracks configured within an outer perimeter of said housing for defining a range of rotation in either of clockwise or counter clockwise directions.

6. The shifter assembly as described in claim 4, further comprising a direct shift functionality from either Park to Drive or Drive to Park shifter positions in response to holding said rotary shaped knob in either of a maximum rotated clockwise or counter clockwise position.

7. The shifter assembly as described in claim 6, said printed circuit board assembly further comprising the processor which, upon receiving an external signal, resetting said shifter assembly to the Park shifter position.

8. The shifter assembly as described in claim 1, an illuminating component associated with said display component further comprising LED elements integrated into a surface display for presenting a pixelated image.

9. The shifter assembly as described in claim 1, an illuminating component associated with said display component further comprising either of a thin film transistor display or an organic light emitting diode display.

10. The shifter assembly as described in claim 1, an illuminating component associated with said display component further comprising segmented LCD elements with LED backlight elements.

* * * * *